United States Patent
Aldridge et al.

(10) Patent No.: US 10,571,902 B2
(45) Date of Patent: Feb. 25, 2020

(54) ROBOTIC PROGRAMMING AND MOTION CONTROL

(71) Applicant: SISU DEVICES LLC, Round Rock, TX (US)

(72) Inventors: Russell Aldridge, Austin, TX (US);
Marc Christenson, Austin, TX (US);
Joshua Bennett, Austin, TX (US);
Joshua Foss, Pflugerville, TX (US);
Jacob Robinson, Round Rock, TX (US)

(73) Assignee: Sisu Devices LLC, Round Rock, TX (US)

( * ) Notice: Subject to any disclaimer, the term of this patent is extended or adjusted under 35 U.S.C. 154(b) by 253 days.

(21) Appl. No.: 15/782,591

(22) Filed: Oct. 12, 2017

(65) Prior Publication Data

US 2018/0101166 A1 Apr. 12, 2018

Related U.S. Application Data

(60) Provisional application No. 62/407,051, filed on Oct. 12, 2016.

(51) Int. Cl.
| | | |
|---|---|---|
| *G06F 19/00* | (2018.01) | |
| *G05B 19/425* | (2006.01) | |
| *B25J 9/16* | (2006.01) | |
| *G05B 19/406* | (2006.01) | |
| *G05B 19/4097* | (2006.01) | |

(52) U.S. Cl.
CPC ......... *G05B 19/425* (2013.01); *B25J 9/1664* (2013.01); *B25J 9/1671* (2013.01); *G05B 19/406* (2013.01); *G05B 19/4097* (2013.01)

(58) Field of Classification Search
CPC ............... G05B 19/425; G05B 19/406; G05B 19/4097; B25J 9/1664; B25J 9/1671
USPC ........................................................... 700/245
See application file for complete search history.

(56) References Cited

U.S. PATENT DOCUMENTS

| | | | | |
|---|---|---|---|---|
| 9,272,418 | B1* | 3/2016 | Guerin | B25J 9/1664 |
| 2002/0082612 | A1* | 6/2002 | Moll | A61B 34/30 |
| | | | | 606/130 |
| 2004/0024311 | A1* | 2/2004 | Quaid, III | A61B 17/3403 |
| | | | | 600/428 |
| 2004/0189675 | A1* | 9/2004 | Pretlove | B25J 9/1656 |
| | | | | 345/633 |
| 2005/0149231 | A1* | 7/2005 | Pretlove | B25J 9/1671 |
| | | | | 700/264 |

(Continued)

*Primary Examiner* — Ronnie M Mancho
(74) *Attorney, Agent, or Firm* — Eversheds Sutherland (US) LLP

(57) ABSTRACT

This disclosure describes systems, methods, and devices related to robotic programming and motion control. A robotic device may determine a connection with a controller device, the controller device comprising one or more buttons and a pointing device. The device may identify one or more input locations associated with the controller device. The device may determine to follow a path of motion of the controller device based at least in part on the one or more input locations. The device may determine an indication of location transition associated with the controller device. The device may determine to transition an end effector of the robotic device to a first position in space relative to the location transition.

18 Claims, 11 Drawing Sheets

(56) References Cited

U.S. PATENT DOCUMENTS

| | | | |
|---|---|---|---|
| 2007/0192910 A1* | 8/2007 | Vu | B25J 5/007 |
| | | | 700/245 |
| 2009/0204261 A1* | 8/2009 | Strand | B25J 9/1656 |
| | | | 700/264 |
| 2010/0262288 A1* | 10/2010 | Svensson | B25J 9/1671 |
| | | | 700/254 |
| 2012/0328395 A1* | 12/2012 | Jacobsen | B25J 3/04 |
| | | | 414/1 |
| 2013/0011220 A1* | 1/2013 | Jacobsen | B25J 3/04 |
| | | | 414/2 |
| 2013/0200543 A1* | 8/2013 | Ross | B21D 31/04 |
| | | | 264/40.1 |
| 2013/0345875 A1* | 12/2013 | Brooks | B25J 9/0087 |
| | | | 700/259 |
| 2014/0005705 A1* | 1/2014 | Weir | A61B 17/00234 |
| | | | 606/169 |
| 2014/0316570 A1* | 10/2014 | Sun | B25J 9/1674 |
| | | | 700/255 |
| 2015/0190925 A1* | 7/2015 | Hoffman | B25J 9/161 |
| | | | 700/257 |
| 2016/0059412 A1* | 3/2016 | Oleynik | B25J 9/163 |
| | | | 700/257 |
| 2016/0257000 A1* | 9/2016 | Guerin | B25J 9/1605 |
| 2016/0327383 A1* | 11/2016 | Becker | G01B 11/005 |
| 2017/0151667 A1* | 6/2017 | Bergstra | B25J 9/1656 |
| 2017/0173795 A1* | 6/2017 | Tan | B25J 9/1666 |
| 2017/0305014 A1* | 10/2017 | Gildert | B25J 9/1664 |
| 2018/0345495 A1* | 12/2018 | Aldridge | B25J 9/0081 |

* cited by examiner

ROBOTIC PROGRAMMING AND MOTION CONTROL

CROSS-REFERENCE TO RELATED APPLICATIONS

This application claims the benefit of U.S. Provisional Application 62/407,051 filed on Oct. 12, 2016, the disclosure of which is incorporated herein by reference as if set forth in full.

TECHNICAL FIELD

This disclosure generally relates to systems, methods, and devices for robotic motion technologies and, more particularly, for robotic programming and motion control.

BACKGROUND

In general, robotic devices consist of multiple axes of motion, allowing robotic control of position and orientation in space. Multi-axis robotic devices are capable of moving within a given number of dimensions in space, allowing points in space to be captured and programmed, which allows a robotic device to move and behave in a certain way. For example, a robotic device having six degrees of freedom (DOF) is capable of a full range of orientations and positions within a given space.

DETAILED DESCRIPTION

Figure 1:
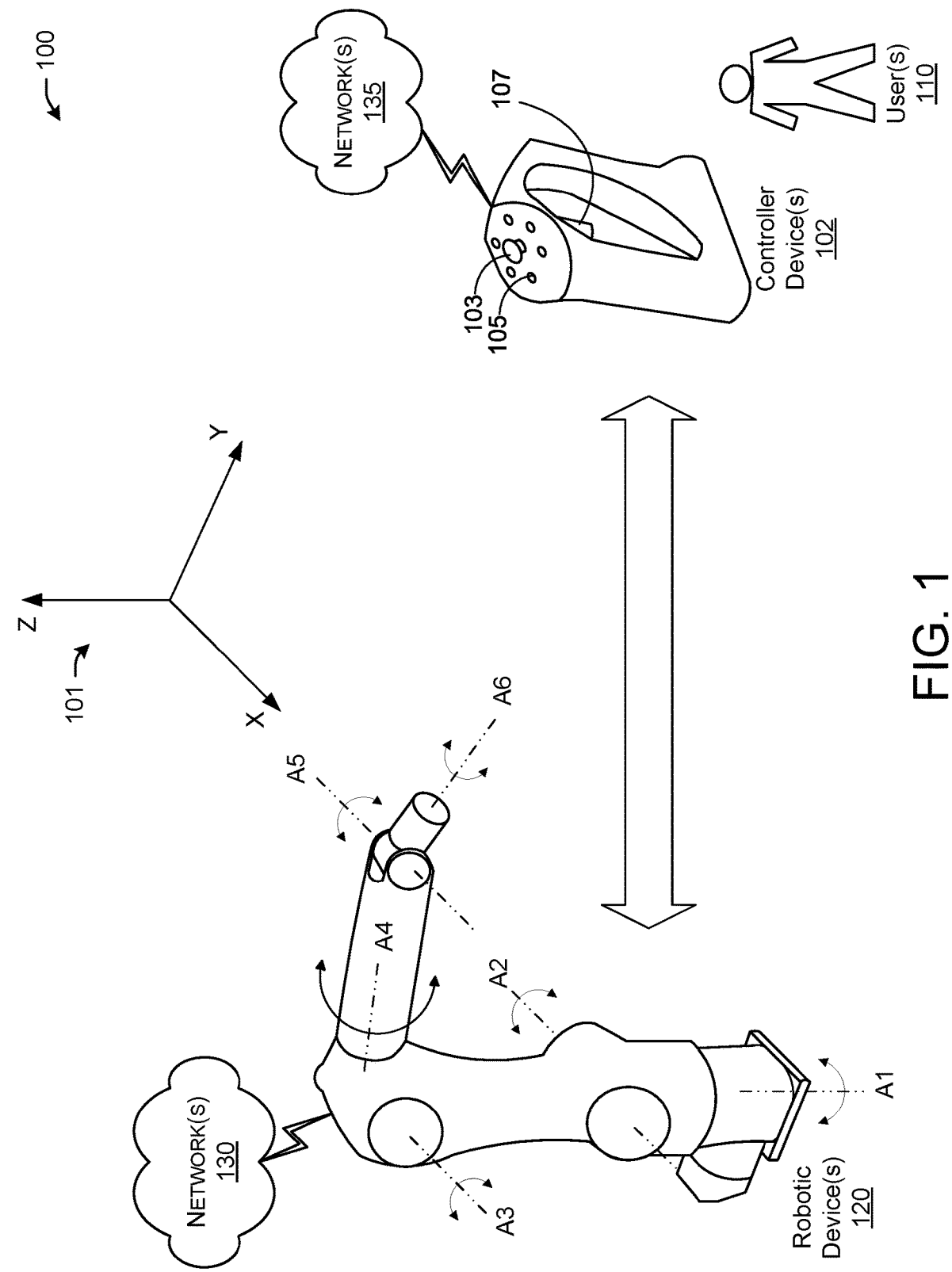
FIG. 1 depicts a diagram illustrating an example network environment of an illustrative robotic programming and motion control (RPMC) system, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Robotic devices consisting of multiple axes of motion may allow robotic control of position and orientation in space. Programming the positions of these axes may be done manually, assigning angular or linear values to each axis and building a sequence of points to accomplish a given task. Programming can also be accomplished by mapping the axes to a coordinate system, allowing the inverse kinematics (IK) of the motion system to control the axes. This is useful particularly for robotic arms and provides for a Cartesian coordinate system to be used in place of a difficult to navigate angular axis coordinate system.

Acquisition of these data points, whether in angular form or in Cartesian coordinate form, is accomplished through a button and touchscreen interface, or using a three-dimensional mouse. In the case of the button and touchscreen interface, individual axes or directions in the Cartesian space are navigated by jogging the robot in different directions by holding a button. A more responsive interface is achieved in the case of the three-dimensional mouse, which captures the relative positional and angular shift of a floating button, allowing the user to jog the robot in a given direction or orientation in a Cartesian coordinate system.

While robust, these interfaces are typically slow and difficult to use. Navigating to different points often requires switching between different modes and ranges of operation, resulting in slow point acquisition. The movements generated by these control systems are also not intuitive, increasing the risk of user error and machine damage.

Robotic devices offer high precision and rapid speeds, but must be controlled in such a way that takes advantage of these qualities while compensating for the large inertia. For example, heavy-duty industrial robotic arms may have inherently large inertia. Some controllers offer a simple way to generate endpoint motions, but suffer from slow settling times and inefficient motions consisting of high initial forces and low final forces.

Example embodiments of the present disclosure relate to systems, methods, and devices for robotic programming and motion control.

In one embodiment, a robotic programming and motion control (RPMC) system may enable one or more orientations associated with a controller device. The controller device may be a handheld device.

In one embodiment, an RPMC system may facilitate activation of a pressure sensitive "trigger" on the controller device that may vary the control mechanism of a robot based on the amount of pressure.

In one embodiment, an RPMC system may facilitate controlling the robot motion based on a hand gesture while holding the controller device. A user may stand in any orientation, activate a pressure sensitive "trigger" on a controller device (e.g., a handheld device), move their hand, and have the robot move in the same direction as their hand. In other words, a user may hold the controller device and may move his or her hand such that the robot moves in the same direction as the hand gesture. That is, the robot may follow the controller device's movement direction regardless of the controller device's orientation and with a speed that is proportional to the amount of force applied to the trigger. At various points in the path of movement, the user is capable of recording points along the path for later execution by the robot. This allows the user to program the robot very quickly and intuitively. Points can be used as point to point moves, where the robot velocity goes to zero at each point, or portions of a "spline" or path, where the controller creates a smooth "path" for the robot where the robot passes through all the indicated points in a smooth manner. The user can go back and adjust or tweak any points as necessary. In other words, they can touch up or modify and redefine a point that has already been entered.

Programming a robot is usually accomplished using a "teach pendant" connected to the robot to slowly move the robot in one direction or one axis at a time. A teach pendant is typically used to program various models of a robotic industrial machinery. The teach pendant may be a device used to manually input locations and points that a robot must go to. This means that users must stay in the same position or readjust in their minds how the robot will move when they press certain buttons. The pendant usually contains fixed buttons or a 3D "space-ball" that allows for control of the robot in a fixed frame of reference. This controller may allow for translation of the end effector in multiple directions at once (XYZ), but does not allow for articulation of the end effector at the same time. An end effector is a device at the end of a robotic arm, designed to interact with the environment. End effectors may consist of a gripper or a tool. The motion is not intuitive and is very time consuming. The user must often stop and switch between different modes of robot control.

Typically robots are programmed by locking in points using a teach pendant and then asking the robot (e.g., the end effector of the robot or a gripper of the robot) to go from one point in space to another based on the locked points. However, the teach pendant location or movement does not affect the end effector's location or movement.

In one embodiment, the RPMC system may facilitate a robot to move in space during a training mode such that a robot is constantly being streamed points as the controller device is being moved in space. In that sense, the robot is constantly trying to reach the location and the orientation of a point in space that the controller device is pointing as it moves in space. At the same time, as the controller device moves in space, the robot (e.g., the end effector of the robot or a gripper attached to the end effector) attempts to catch up to a location relative to the location of the controller device, but will always be behind the movements of the controller device, in time. In other words, the controller device may continuously send to the robot, at a predetermined time interval, points in space that the controller device is traversing through. Further, the movements of the robot may be constantly interrupted as the controller device moves in space and constantly changing from point-to-point. For example, when a user presses a trigger or a button on the controller device and moves his or her hand in a particular direction until letting go of the trigger at a destination. As a consequence, the robot moves to a location in space relative to the destination. If the user is happy with the location of the robot, the user may press a button on the controller device or on an external device (e.g., tablet), the user may lock that destination point in space, such that the robot is capable of going back to that destination point in space during the execution mode.

In another example, as a user moves the controller device from point A to point B, the robot moves from point A towards point B, however, if the user moves the controller device to point C instead of point B, the robot must adjust and move towards point C in a steady, fluid manner. This is also true for small variations and interruptions in the motion of the controller device as the user moves the controller device in space. These types of small variations and interruptions may happen very seamlessly that are not visible but occur because of the unsteadiness of a user's hand as he or she moves the controller device in space. An iterative numerical approach may be employed, which may be a simple algorithm that ensures a smooth transition when changing the desired end-point or velocity mid-motion at any point in the robot trajectory.

In one embodiment, an RPMC system may facilitate that the controller device is capable of entering a training/programming mode and an execution mode. In some embodiments, the controller device is able to interrupt execution and then go back into training mode and vice versa. The controller device may include one or more buttons that may be used to capture one or more points in space associated with a location of the robotic device in a learning mode. Further, the controller device may include navigation buttons that may delete one or more points in space in an execution path. For example, the user may press a first button on the controller device in order to capture a point in space. The user may then move his or her hand to another location in space and then press the same button to capture another point in space and so on. This will create a path of movement that the robot can repeat in an execution mode. The user may initiate the execution mode using a button on the controller device. In that case, the robot may follow that path such that its end effector(s) traverses the points that were captured using the controller device at each button press during the teaching mode.

In one embodiment, the user also controls the speed of the robot during "playback" or "execution" by varying the pressure on the trigger. If the trigger is pressed fully, the robot goes at the full "safety speed" allowed. If the trigger is released, the robot stops. The user modulates speed of the robot during playback to test the program slowly in critical parts, but save time by moving quickly through non-critical parts.

The controller device may include additional buttons and trigger buttons for performing other programming actions. It should be appreciated that the buttons may be programmed based on a user preference and profile. It should also be appreciated that the buttons may be located on the controller device or on additional devices, such as a tablet, a mobile phone, a laptop, or any other device capable of communicating with the RPMC system to train the robot. Although the controller device may be operated on its own, a tablet allows for functions like viewing and editing the programming, adjusting points and saving programs, the user can define speed acceleration change move types and activate rippers. The user may also add program logs for machine vision or welding. The Sisu robot controller takes robot programming to a new level by dramatically decreasing the time and complexity of programming thousands of new applications now open automation.

In one embodiment, an RPMC system may facilitate a training mode where the controller device is capable of learning and capturing points in space at various locations being traversed during the training mode. The captured points may be stored on a memory device as points and/or as programs for later retrieval during an execution mode. The user may press the pressure sensitive trigger to gain control of the robot. The robot may be moved into the desired position and orientation of a point in space and then the trigger is released. A button is pressed on the controller device to "add" the point. Adding the point means that the point is recorded into the program for later execution in the execution mode. The robot may then be moved to subsequent positions and orientations where additional points are added. Buttons can be configured on the controller to manipulate various functions of the robot or end effector. An example of an end effector may be a gripper on the robot such that the gripper is capable of gripping objects to be manipulated by the robot. A new point in space can be added to a given position that opens or closes the gripper at that position.

In one embodiment, an RPMC system may facilitate alteration of recorded points and/or addition of new points to be recorded. For example, a user is capable of scrolling to various recorded points and then pressing a button to modify or insert a point. The user is also capable of adjusting the robot to the desired position and "add" the point.

In one embodiment, an RPMC system may allow the user to translate and articulate the end effector in all six axes of motion simultaneously. The RPMC system may also allow the user to seamlessly switch from macro movements to fine "jog" type movements, which are controlled by a pointing device (e.g., a joystick) on the controller device. The direction of jog is defined by the orientation of the controller and updates dynamically as the user changes the controller's orientation. The RPMC system may also allow the user to release the trigger (thus stopping the action of moving the robot), reposition his or her hand, grab the trigger, and move the robot again. Control of the robot is independent of how the user is facing. The user just pushes or pulls the robot where it needs to go and if the user goes to the other side of the machine the user does not have to think backwards when controlling the robot.

In one embodiment, an RPMC system may facilitate that an axis associated with the controller device is not fixed in space. That is, as the control device is moved in space, its axis is also moving. Therefore, if the controller device is pointed vertical to the ground, the axis associated with the controller device will be similarly oriented. If the control device is pointed horizontal to the ground, the axis associated with the control device will be oriented in that direction. Therefore movements of the end effector along one of the Cartesian axis (e.g., X axis, why axis, or Z axis) will always be on that Cartesian axis as the handheld device is moved in space in different orientation.

Wherever the pointing device (e.g., a joystick) movement is directed to, based on its original axis, the robot end effector moves in that direction regardless of whether the controller device is held vertical, tilted, or horizontal to the ground. For example, if the controller device is held in a manner that the handle is perpendicular to the ground, and the user pushes the joystick to the left of the user, the end effector of the robot would move to the left of the user. In another example, if the controller device is held in a manner that the handle is horizontal to the ground and the user pushes the joystick towards the floor, the end effector of the robot would also move towards the floor. This is the case even though relative to the original axis of the handheld device, the joystick was pushed in the same direction in both examples. In effect, the user is capable of maneuvering the original axis of the controller device without impacting or changing the axis of the robot.

In one embodiment, the RPMC system may define one or more reference planes allowing a user holding the controller device and using a pointing device (e.g., a joystick) on the controller device and/or one or more buttons on the controller device to move the end effector of a robot to move in a desired direction. The one or more reference planes may include at least a global reference frame and a tool reference frame. The global reference frame may be a reference frame that is common to one or more devices, such as, the robot end effector and the controller device. The tool reference frame may be a reference frame that follows the end effector or a tool attached to the end effector. Therefore, if the controller device is locked to the global reference frame, the controller device and the end effector of the robot follow the global reference frame. If the control device is locked to the tool reference frame, the control device and the end effector of the robot follow the tool reference frame.

The user can switch between a global reference frame and a tool reference frame. This allows for movement in the same direction as the end effector, an important feature for assembly or machine tending. For example, the user may hold the controller device parallel to the ground and use the joystick to move in up or down directions relative to the ground or up and down directions relative to the end effector orientation.

In one embodiment, the RPMC system may allow the user to lock the end effector of a robot at a point in space and articulate around that point or lock all other axes and rotate the end effector around a single axis. For example, after a user moves the controller device and/or the joystick of the controller device resulting in the end effector of the robot moving to a point in space, the user may lock the position of the end effector around that point in space. Therefore, any further movements by the controller device or the joystick of the controller device, will articulate around that point. Similarly, a user may be able to lock one or more axes and rotate the end effector around a single axis.

In one embodiment, the RPMC system may facilitate locking the robot end effector so that the orientation of the end effector remains constant, and it only translates when moved by hand or by the joystick. For example, a user may decide to lock the end effector on a specific angle (e.g. 45° angle). In the event the user wants to move the robot without changing the angle of the end effector, the user may hold the controller device in a specific orientation based on either a global frame of reference or a local or tool frame of reference of the robot. For example, if the user selects a global frame of reference, the user may then move relative to that global frame of reference resulting in movements of the robot based on that global frame of reference regardless of the specific angle of the end effector. In other words, effector is at a specific angle, moving the controller device up or down results in moving the robot arm up or down without changing the specific angle that the end effector is at. However if the user selects a local or tool frame of reference, the user would then align the controller device based on the local or tool frame of reference. Then by pressing the joystick in any direction of the access of the local or tool frame of reference, the robot arm would move in that direction.

In one embodiment, an RPMC system may determine a motion profile having one or more stages of motion. The one or more stages of motion may be associated with the application of velocity, acceleration, and jerk. The RPMC system may capture one or more positions and states of a robotic device to facilitate a full sequence of motions.

In one embodiment, the RPMC system may determine a motion profile having unknown initial and final conditions by combining a numerical method as well as an iterative method.

In one embodiment, the RPMC system may apply an iterative method in order to determine a midpoint velocity. The iterative process may replace an upper or lower bound value with a current midpoint based on a resulting undershoot or overshoot condition of a final position.

In one embodiment, the RPMC system may perform successive iterations in order to converge to a single solution for the midpoint velocity.

In one embodiment, the RPMC system may determine that no time is spent during a middle stage of a motion profile. During the middle stage of the motion profile, constant acceleration may occur. This implies that the motion profile may ramp the acceleration as high as possible within the given maximum jerk bounds, and then immediately ramp the acceleration back down to zero to finally arrive at the desired final velocity. As long as the acceleration value at the middle of the motion profile remains below the maximum allowable acceleration during this motion, then the profile is considered a valid profile and is used as the solution.

In one embodiment, the RPMC system may solve an S-curve of a motion profile using either a time-based binary search or a midpoint velocity-based binary search based on whether an overshoot or an undershoot condition occurs.

In one embodiment, the RPMC system may determine in a time-based binary search that a motion moves from a current position up to a maximum velocity at some final time assuming that the maximum position may not be reached in that motion. The RPMC system determines to reach a certain point in that motion and then from that point transition to a second half of the motion. For the first half of the move, a time-based binary search solves for a time that allows completing the second half of the move to ultimately reach the final desired position. In other words, with the time-based binary search, a first half of the move may be solved, such that, when reaching a midpoint velocity and completing the move, an overshoot condition may occur. The S-curve for the second half may also be solved, where the deceleration did not cause an overshoot condition. Accordingly, certain acceleration is needed in order to reach the desired final distance. An overshoot condition occurs when a distance is more than the desired distance. It is understood that the above descriptions are for purposes of illustration and are not meant to be limiting.

In one embodiment, the RPMC system may facilitate an execution mode of robotic motion based at least in part on the training mode. For example a user may execute a previously trained robot by pressing a button to move the robot into "play-back" or "test-run" mode. In that case, the user may press a button to cycle or traverse the robot from one pre-recorded position to the next. The user may scroll through these points and may use the trigger on the controller device as the speed control for the robot. To execute a program, the user may use the controller device or any other devices (e.g., a tablet) to run the program. Testing and running a program is safe and the user controls the robot speed with the trigger during program execution. The user can step through points one point at a time, or play the entire program straight through, and even run the program in reverse. Although the controller device may be operated on its own, a tablet allows for functions like viewing and editing the programming, adjusting points and saving programs, the user can define speed acceleration change move types and activate rippers. The user may also add program logs for machine vision or welding. The Sisu robot controller takes robot programming to a new level by dramatically decreasing the time and complexity of programming thousands of new applications now open automation.

Advantages of the RPMC system include increase ease and speed in programming a robotic device to perform or repeat actions that were originally programmed using the handheld device (e.g., a teach pendant). Tests show a process whereby a robot can be programmed to perform a series of moves around 10 times as fast as current methods. Even with the increased speed and convenience of this control method, dexterity and fine position control are maintained.

FIG. 1 is a diagram illustrating an example network environment of an illustrative robotic programming and motion control (RPMC) system, in accordance with one or more example embodiments of the present disclosure. The network environment 100 may include robotic device(s) 120, one or more controller devices 102 and a system control device, which may communicate in accordance with, and be compliant with, various communication standards and protocols, such as Wi-Fi, user datagram protocol (UDP), time sensitive network (TSN), wireless (or wired) USB, Wi-Fi peer-to-peer (P2P), Bluetooth, near field communication (NFC), or any other communication standard.

Figure 6:
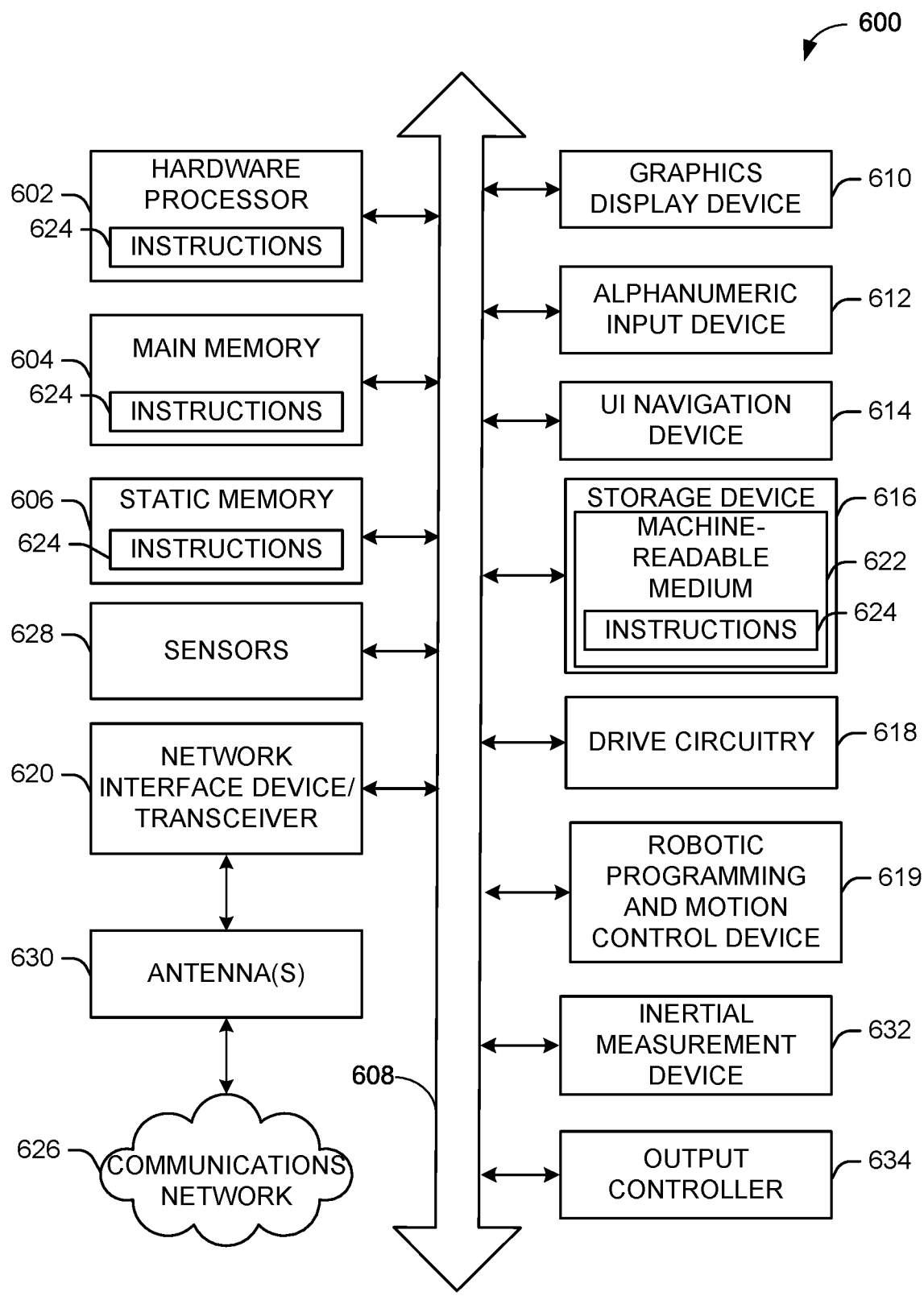
FIG. 6 illustrates a block diagram of an example robotic machine upon which any of one or more techniques (e.g., methods) may be performed, in accordance with one or more example embodiments of the present disclosure.

In some embodiments, a robotic device 120, a controller device 102, and a system control device may include one or more computer systems similar to that of the example machine/system of FIG. 6.

An S-curve refers to the shape of a velocity profile of a given move or motion. It may be a trajectory that has a trapezoidal acceleration profile, giving an S-shaped velocity profile. Without using an S-curve, when acceleration, velocity, and position are loaded, a motor associated with the robotic device may attempt to go from zero to a specified acceleration instantaneously. When the motor is ready to stop, it once again may go from zero acceleration to a negative acceleration as fast as it can until it is at zero velocity and then abruptly stops. These abrupt starts and stops may create sharp corners of the trapezoidal profile. The sharp corners translate to a very high jerk. Jerk is determined as the derivative of the acceleration and refers to abrupt changes in acceleration. To reduce the jerk, the transition into maximum acceleration may need to occur smoothly by slowly reaching a target acceleration or deceleration. The S-curve may be used to slowly reach a certain acceleration or deceleration. Smoothing out the corners of the trapezoid using the S-curve reduces jerk and prolongs the life of the mechanical parts. For a general trapezoidal profile, four acceleration values may be specified in an S-curve profile. These acceleration values are a ramp up to maximum acceleration, a ramp down from maximum acceleration, a ramp up to maximum deceleration, and a ramp down to zero acceleration.

In one embodiment, and with reference to FIG. 1, a robotic device 120 may communicate directly with the controller device 102. For example, the two devices may communicate through a wired or a wireless connection. However, in some scenarios, the robotic device 120 and the controller device 102 may communicate through various networks (e.g., network 130 and/or 135) or through a system control device.

The robotic device 120 may have various applications. For example, the robotic device 120 may be configured as an industrial robot, an aerospace application, an automation tool, or any other applications.

The controller device 102 may be a handheld device, which may be used as a form of motion input. The controller device 102 may comprise a joystick in addition to other input buttons and/or trigger buttons. The vector of joystick motion may be mapped to a plane intersecting the controller device 102, and corresponding global position vectors are applied to the robotic device 120. The vector of joystick motion may be left, right, up, down, forward, and backward.

The control device 102 and the robotic device 120 may communicate through a system control device determine the position and orientation of both the control device 102 and the robotic device 120 at a specific time. The system control device may facilitate communication between the control device 102 and the robotic device 120 in order to effectuate movement of the robotic device 120 such that a tool or an end effector of the robotic device 120 is capable of moving from one point to another point in space.

The controller device 102 may control the robotic device 120 by transmitting control signals to the robotic device 120 through a wire or through wireless signals and vice versa. For example, the controller device 102 may send the control signal as an Ethernet packet through an Ethernet connection to the robotic device 120. Further, the controller device 102 may send and receive messages with the robotic device 120 using the system control device.

The controller device 102 may be an instrument capable of sending information to the application programming interface (API) for the robotic device 120. Some example of these instruments may include handheld devices, wireless devices, such as, devices that are capable of position and orientation. The controller device 102 may include one or more distinct advantages: 1) it has a constant reference (magnetic field generator with a fixed location) whereas other wireless devices' reference would drift over time; and 2) the fixed reference is not optical so nothing can get between the base and the controller to interrupt the signal. The controller device 102 may comprise one or more buttons 105, a joystick 103, and a trigger 107.

The controller may have the following inputs buttons, triggers, and joysticks. For example, using a joystick may lock all other axes and rotate axis 6 by moving the joystick left or right. Further, a trigger button may cause the robot to move with controller. Also the trigger button may be used as the speed control method for playing back the programmed moves. Speed can be also proportional to joystick movement. Speed can also start slow and then increase automatically the longer the joystick is held.

Joysticks: Jog (translate) robot end effector point in one direction only at a slow, constant speed (fine jog). Direction depends on the orientation of the controller. When the joystick is upright, moving the stick will cause the robot to translate in the XY plane. When the controller axis is parallel to the ground (controller turned sideways—like laying on a table), the joystick will cause the end effector point to move in the XZ or YZ plane. Basically the end effector point moves along the same plane as the orientation of the joystick plane. It should be understood that the controller device, the joystick on the controller device, and the trigger on the controller device control the robot in moving along axes, along planes, and rotationally in three dimensional space. In order to make the robot rotate, the user device may rotate the hand held controller device, or my use the joystick or the trigger to cause the robot to rotate in space. The controller device 102 and/or the robotic device 120 may communicate using a robot communication protocol such as a user datagram protocol (UDP). A UDP message may be sent from the robotic device 120 to the controller device 102 or vice versa. A reply to the UDP message may contain a next position or a new position that the robotic device 120 will move to.

The robotic device 120 may receive the control signal and may be controlled by the received control signal. For example, the control signal may cause the robotic device 120 to apply or remove pneumatic air from a robotic gripper of the robotic device 120. Further, the control signal may cause the robotic device 120 to move to a new position in space. When the robotic device 120 receives the control signal, new state information is applied, and any needed motion to the new position may be executed. The robotic device 120 may also transmit a signal indicating its status to the controller device 102.

The robotic device 120 may be configured to rotate along rotation axes of motion. The robotic device 120 consisting of these rotation axes of motion may allow control of the position and orientation in space. For example, the robotic device 120 may have six degrees of freedom (DOF) resulting in a full range of orientations and positions within a given space. Programming the positions of these rotation axes may be done manually, by assigning angular or linear values to each axis and building a sequence of points to accomplish a given task. Programming can also be accomplished by mapping the axes to a coordinate system (e.g., coordinate system 101), allowing the inverse kinematics (IK) of the motion system to control the axes. This is useful particularly for robotic arms and provides for a Cartesian coordinate system to be used in place of a difficult to navigate angular axis coordinate system.

In the example of FIG. 1, the robotic device 120 may be configured to have six rotation axes, A1, A2, A3, A4, A5, and A6. Each of the rotation axes A1, A2, A3, A4, A5, and A6 is able to allow a section of the robotic device associated with that axis to rotate around that axis. When all of the angles of the rotation axes A1, A2, A3, A4, A5, and A6 are determined, the entire status of the robotic device 120 may be determined.

In one embodiment, the controller device 102 and the robotic device 120 may utilize a synchronized coordinate system (e.g., coordinate system 101) that facilitates mapping all of the rotation axes A1, A2, A3, A4, A5, and A6 to the coordinate system 101. Moving the controller device 102 along at least one of the axes of the coordinate system 101 may control the angles of the rotation axes A1, A2, A3, A4, A5, and A6 of the robotic device 120 according to the position, orientation, and movement of the controller device 102. That is, a user 110 may be able to manipulate the position, orientation, and movement of the controller device 102 and, as a result, manipulating the position, orientation, and movement of the robotic device 120. The position, orientation, and movement of the controller device 102 may be translated into instructions that may be used in one or more control signals to control the robotic device 120. Ultimately, these instructions may control the angles of the rotation axes A1, A2, A3, A4, A5, and A6, in order to perform a certain action or to move the robotic device 120 to a new position in space.

Figure 2A:
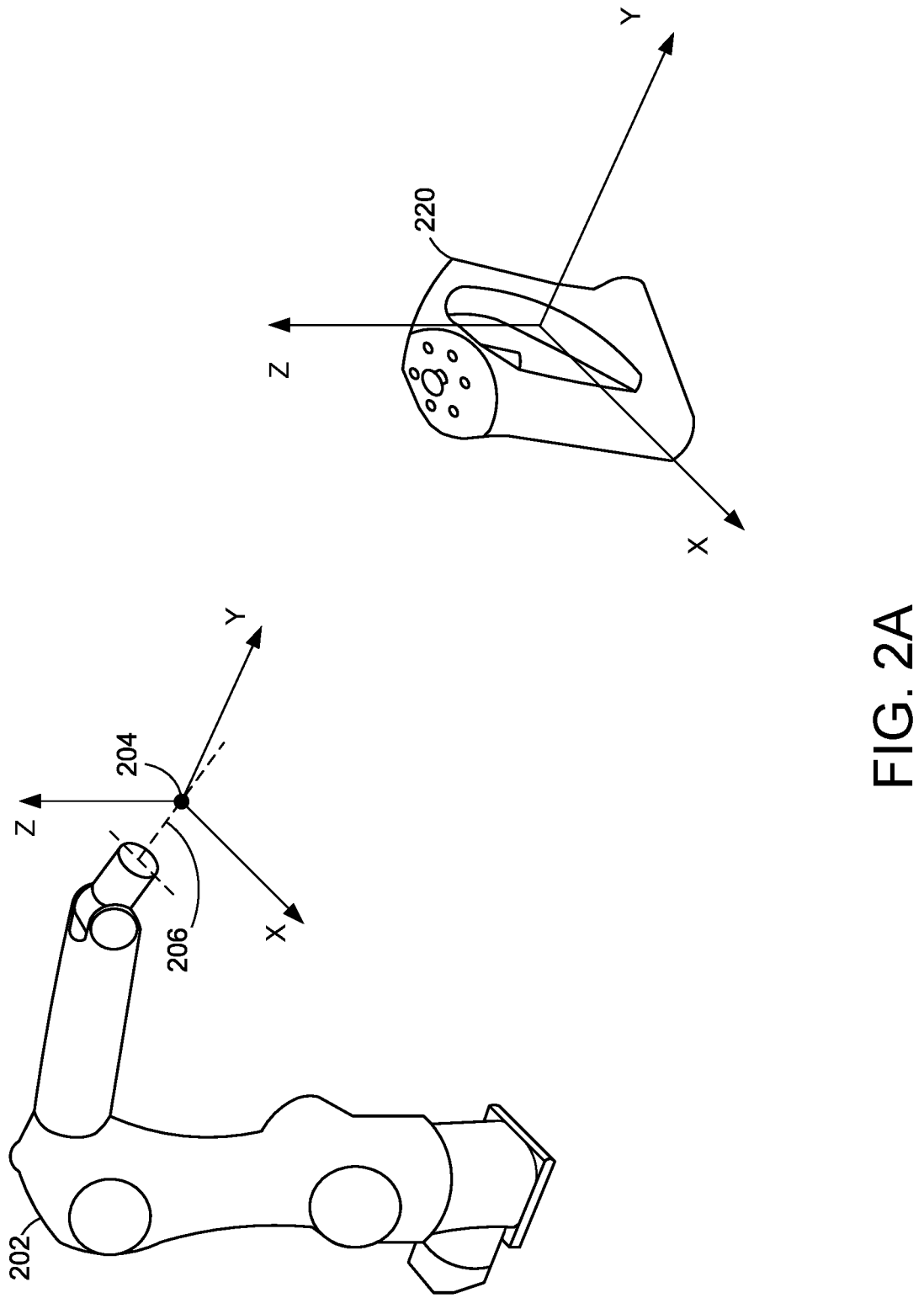
FIGS. 2A and 2B depict illustrative schematic diagrams of an RPMC system, in accordance with one or more example embodiments of the present disclosure.
Figure 2B:
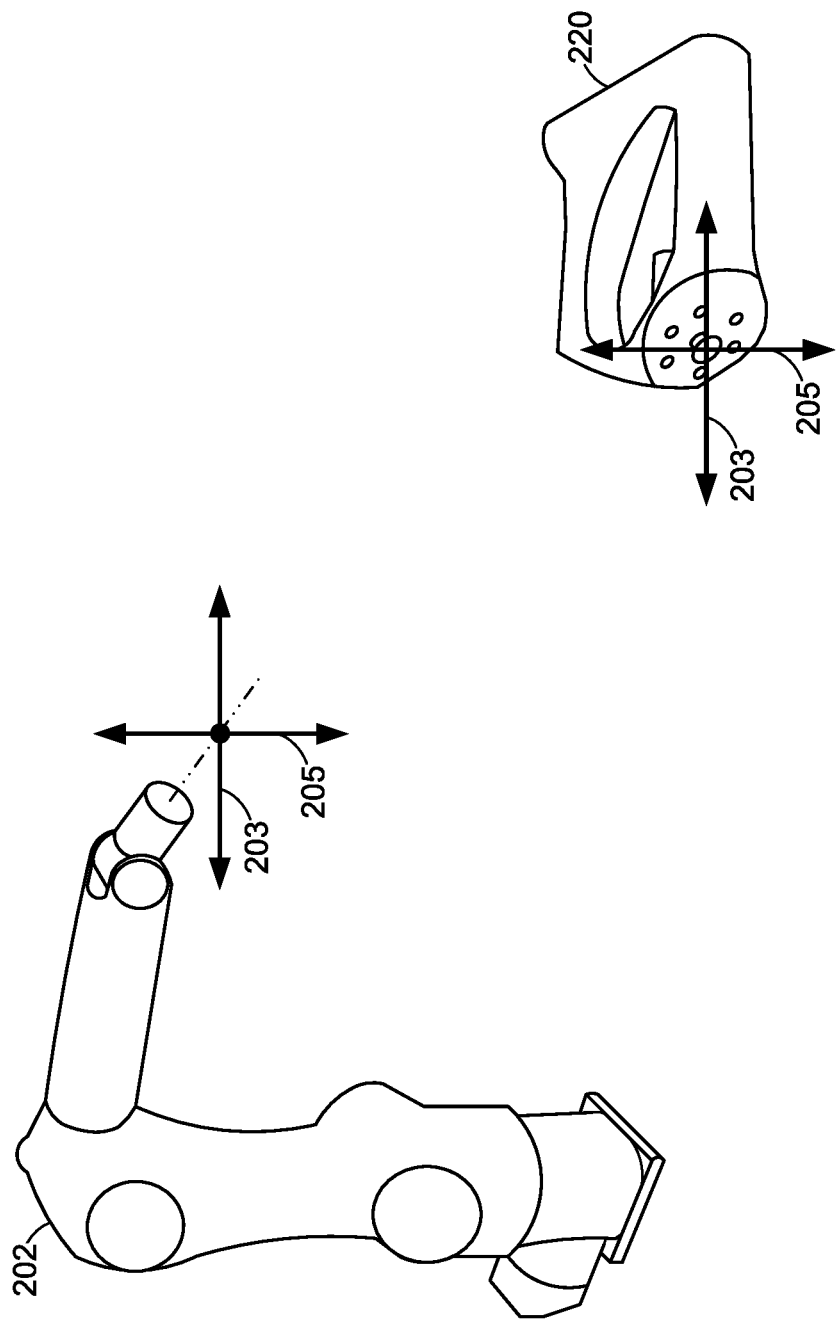

FIGS. 2A and 2B depict illustrative schematic diagrams of an RPMC system, in accordance with one or more example embodiments of the present disclosure.

Referring to FIG. 2A, there is shown a robotic device 202 and a controller device 220 (e.g., a handheld device). The controller device 220 may include one or more button that may be pressed to effectuate one or more features of the controller device 220.

In one embodiment, an RPMC system may manipulate the orientation and position of the robotic device 202 based on inputs from the controller device 220, which may be controlled by a user. In other words, the orientation of the controller device 220 and other inputs on the controller device 220 may result in the robotic device 202 moving its one or more end effectors to a desired location. For example, a user who may hold the controller device 220 may vary the orientation and position of the controller device 220, in order to generate a respective orientation and position of the robotic device 202. In that sense, the user is capable of moving the controller device 220 in space, to cause a movement of the robotic device 202 end effectors from one point in space to another. A user may program the robotic device 202 by moving the controller device 220 through a desired path.

In one embodiment, an RPMC system may facilitate a training mode such that the controller device is capable of learning and capturing points in space at various locations being traversed using the controller device. The user may press the pressure sensitive trigger to gain control of the robot. The robot may be moved into the desired position and orientation of a point in space and then the trigger is released. A button is pressed on the controller device to add the point. Adding the point means that the point is recorded into the program for later execution in the execution mode. The robot may then be moved to subsequent positions and orientations where additional points are added. Buttons can be configured on the controller to manipulate various functions of the robot or end effector. An example of an end effector may be a gripper on the robot such that the gripper is capable of gripping objects to be manipulated by the robot. A new point can be added to a given position that opens or closes the gripper at that position.

In one embodiment, an RPMC system may facilitate alteration of recorded points and/or addition of new points to be recorded. For example, a user is capable of scrolling to various recorded points and then pressing a button to modify or insert a point. The user is also capable of adjusting the robot to the desired position and add the point.

In one embodiment, the RPMC system may activate the robot control when the user presses the pressure-sensitive trigger on the controller device. For example, a point 204 may be defined at some predetermined distance (e.g., distance 206) from the end of the robot arm. When the user moves the controller device 220 upward, all axes of the robot move in a coordinated fashion so that the end result is that the point moves upward in space. It should be understood that the distance traveled by the point 204 may be proportional to the distance traveled by the controller device 220. That is, if the user moves the controller device 220 upward by a distance D, the point 204 may also move upwards by a distance that may be proportional to the distance D. To activate the robot control, the user presses the pressure-sensitive trigger. Imagine a point defined some fixed distance from the end of the robot arm (see image below with red dot point). When the user moves the controller upward, all axes of the robot move in a coordinated fashion so that the end result is that the point moves upward in space. The same is true for movements of the controller device 220 down, left, right, forward, and back. It should be understood that this type of movement is referred to as translation. That is translating the movement of the controller device 220 into movements of the robot device 202.

In one embodiment, the RPMC system may map the positions and orientations of the controller device 220 into robot coordinates, through direct Cartesian coordinate representation or through abstracted axis motion mapping.

In one embodiment, the RPMC system may generate an appropriate motion from the indicated input, and immediately direct the robotic device 202 to move towards a new final position. In another embodiment, the RPMC system may capture positions of the robotic device 202 when the user positions the controller device 220 in order to arrive at a desired location. The RPMC system may store these positions for future playback and adjustment.

In one embodiment, the controller device 220 may include navigation buttons that may be used to capture one or more points in space associated with a location of the robotic device 202. Further, the controller device 220 may include navigation buttons that may delete one or more points in space. The controller device 220 may include additional button and trigger buttons for performing other programming actions. It should be appreciated that the navigation buttons may be programmed based on a user preference and profile.

In one embodiment, the RPMC system may facilitate a plurality of robotic devices 202 to be controlled simultaneously using multiple controller devices 220. Consequently, motions may be performed in parallel and coordinated moves between two or more robotic devices 202 may be accomplished in real time through the use of one or more controller devices 220.

In one embodiment, the RPMC system may facilitate pressure sensitive button control of the navigation buttons of the controller device 220. The pressure sensitive button control may be used to determine a range of motion generated by shifting positions and orientations from the controller device 220. This may allow the user to indicate the degree to which position and orientation changes will affect the robotic or motion control position. For example, by squeezing the trigger button fully, the RPMC system may generate a large motion. The RPMC system may generate small motions by releasing pressure from the trigger button. Fully releasing the trigger may disengage the robotic motion entirely. In another embodiment, engaging and disengaging motion can be accomplished through the use of a button, a slider, or another tactile input device.

In one embodiment, the RPMC system may determine that completely releasing the trigger button may allow the controller device 220 to be moved to a new position in space before re-engaging control. This may allow a click and drag motion to be accomplished, enabling the user to move across large distances with very little effort. It should be understood that the controller device, the joystick on the controller device, and the trigger on the controller device control the robot in moving along axes, along planes, and rotationally in three dimensional space. In order to make the robot rotate, the user device may rotate the hand held controller device, or my use the joystick or the trigger to cause the robot to rotate in space. This means that the robot can be controlled not only in XYZ with the trigger, but also in roll, pitch, and yaw.

Referring to FIG. 2B, axis locking is shown such that a controller device 220 is able to rotate without affecting the orientation of the coordinate system of the robotic device 202. The orientation of the coordinate system of the robotic device 202 is shown in two dimension having direction 203 and direction 205 for simple illustration. However, it should be understood that although a two dimensional coordinate system is shown, three dimensional implementation may be envisioned.

In one embodiment, the controller device 220 may be rotated by a user moving their hand in space to align the controller device 220 to be parallel to the ground or perpendicular to the ground or any other orientation without affecting how the joystick is moved on the control device 220. That is, although the control device 220 may be in one orientation in space, pushing the joystick in the direction 205, causes the robotic device 202 to move in direction 205. Similarly pressing the joystick to move in direction 203, causes the robotic device 202 two move in direction 203.

In one embodiment, the controller device 220 may include a button that may be used to activate axis locking, in which the dominant direction of translation or rotation from the user is detected. When this axis of translation or rotation is detected, the RPMC system may lock out or freeze motion in all other axes, allowing control in this particular axis of motion without disturbing other directions. For example, in the case where the controller device 220 does not translate, but remains in the same XYZ position in space. When the user rotates the controller device 220 about the controller centroid, the robot device 202 moves all axes in a coordinated fashion so that the imaginary point remains in its own fixed point in space, but the end of the robot arm remains "pointed" at that imaginary point, and rotates about it. This means the robot can pitch up and down, yaw left or right, or remain pointed in the same direction, but rotate about the axis in the direction it's pointed.

Axis locking may be activated on global Cartesian axes (e.g., axes X, Y, Z) of the robotic device 202. This may allow locking the translations in the global X, Y, or Z axes, and may also allow locking the rotations about the global X, Y, or Z axes. Axis locking may also be accomplished with respect to local coordinates relative to the end effector of the robotic device 202. Consequently, local movements of the end effector may be mapped and controlled.

Further, axis locking may include the ability to map to a particular axis of the robotic device 202, allowing individual axes to be jogged while ignoring inverse kinematics (IK) mapping or Cartesian axes. For example, the RPMC system may determine the motion of the controller device 220 along the relative controller X axis, and the relative controller Z axis is translated into motion in the corresponding local axis X of the robotic device and the local axis Z of the robotic device. By engaging axis locking, motions in the dominant relative axis of the controller device 220 may be mapped directly to the corresponding local axis of the robotic device. It is understood that the above descriptions are for purposes of illustration and are not meant to be limiting.

Figure 3A:
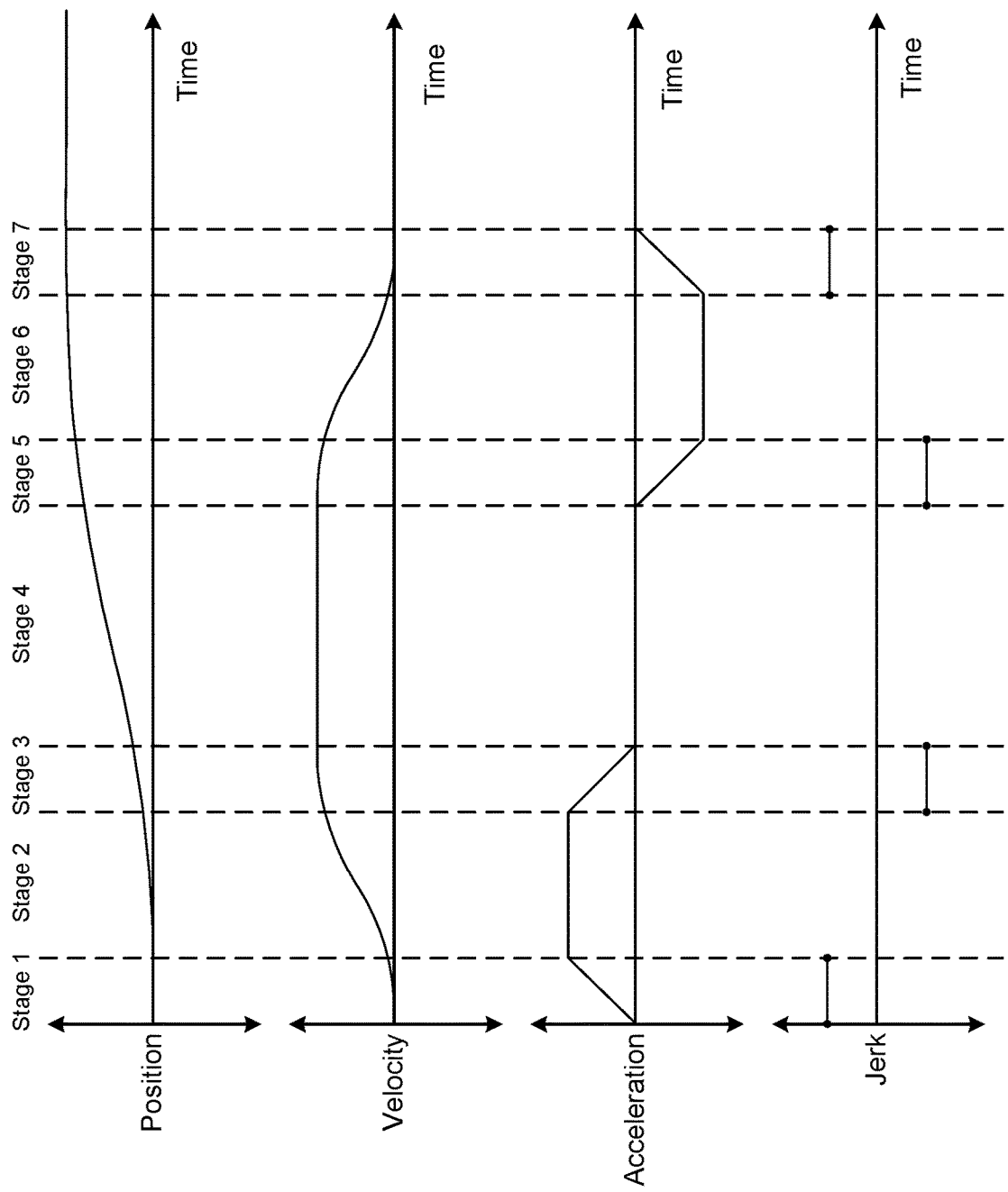
FIG. 3A depicts basic elements of motion in a constant jerk motion profile, with corresponding position, velocity, and acceleration profiles.

FIG. 3A depicts basic elements of motion in a constant jerk motion profile, with corresponding position, velocity, and acceleration profiles.

Referring to FIG. 3A, there is shown seven stages of an s-curve trajectory showing position with velocity, acceleration, and jerk derivatives.

Industrial robots offer high precision and rapid speeds, but must be controlled in such a way that takes advantage of these qualities while compensating for the large inertia inherent in a heavy-duty industrial robot arm. A motion profile for a robot arm may consist of a solution to the kinematic equations of velocity and acceleration by applying constant jerk at varying sections of the motion profile.

The mathematical definition of velocity, acceleration, and jerk is shown in Equations 1, 2, and 3. The resulting solution for position as a function of time given initial conditions is shown in Equation 4.

$$\text{Velocity} = \frac{dPosition}{dt} \quad (1)$$

$$\text{Acceleration} = \frac{dVelocity}{dt} \quad (2)$$

$$\text{Jerk} = \frac{dAcceleration}{dt} = \frac{d^3 Position}{dt^3} \quad (3)$$

$$\text{Position}(t) = \quad (4)$$
$$\frac{1}{6} * Jerk_{Init} * t^3 + \frac{1}{2} * Accel_{Init} * t^2 + Velocity_{Init} * t + Position_{Init}$$

An example form of a linear motion profile may have a number of stages of motion. In this example, seven stages of motion are used for illustrative purposes. These seven stages may alternate between maximum jerk, zero jerk, and negative maximum jerk, with corresponding accelerations, velocities, and positions solved from these corresponding applied jerk values.

Each stage of the seven-segment motion profile may be defined by initial motion conditions and a total amount of time spent in each stage. These parameters may define the initial values of the motion profile at the start of the stage, and also contain all of the needed information to extrapolate the resultant motion profile throughout the stage. Using the above, a motion profile with a given initial position, velocity, acceleration, and final position may be generated. One or more of these motion profiles may be combined in order to create a set of motions. The set of motions may be played back by applying equation 4 to each stage, and generating points at any given time within the individual stage. The time value for each individual stage may be independent of the previous stage, so the total elapsed time for each stage of the seven-segment motion profile must be tracked and subtracted appropriately for each stage.

An S-curve motion profile may be generated with zero initial velocity and acceleration and zero final velocity and acceleration by utilizing software libraries, embedded motion controllers, or any other implementation. However, for arbitrary initial and final motion conditions, the mathematical solution becomes more complicated.

In one embodiment, an RPMC system may solve a motion profile with unknown initial and final conditions, by combining a numerical method as well as an iterative method. The numerical portion of the solution builds motion profiles where the velocity during stage four is set to the maximum or minimum velocity parameter. If the final position resulting from this solution is not sufficient to arrive at the desired final position, resulting in a position undershoot condition, then additional time must be spent during stage four, at the minimum or maximum velocity, to travel the required distance and arrive at the final position. With the undershoot distance known, the remaining time required to travel the needed distance can be solved using the formula shown in equation 5.

$$Time_{Stage\ 4} = \frac{|Position_{Final} - Position_{Undershoot}|}{Velocity_{Maximum}} \quad (5)$$

When a position overshoot condition occurs for both maximum and minimum velocity solutions at stage 4, the velocity at stage 4 must exist somewhere between the maximum and minimum velocity in order for the final position of the motion profile to arrive at the desired position. Solving for this mid-point velocity is a non-trivial equation of variable conditions, requiring many cases and solutions to be handled to obtain a closed form solution. However, the correct midpoint velocity can be solved using an iterative method. By setting initial boundary values at the maximum velocity and the negative maximum velocity, the correct midpoint velocity can be approximated by running successive solutions about the midpoint of these two boundary values. After running a single iteration, the appropriate upper or lower bound values are replaced with the current midpoint, based on the resulting undershoot or overshoot condition of the final position.

One key advantage of S-curve trajectory generation is the limited jerk derivative. This results in more even motion transitions as compared with traditional trapezoidal trajectory with infinite jerk. It is understood that the above descriptions are for purposes of illustration and are not meant to be limiting.

Figure 3B:
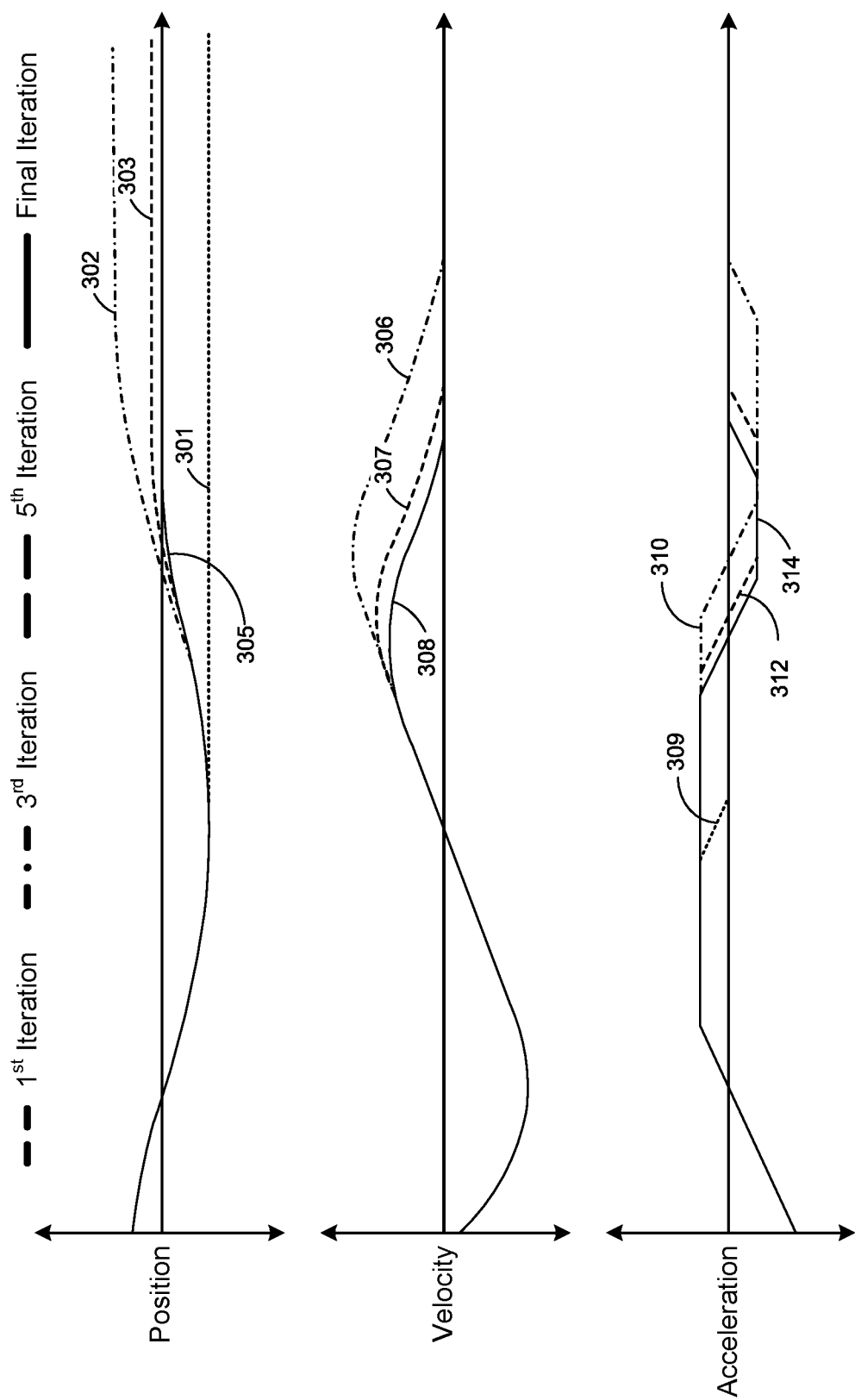
FIG. 3B depicts an illustrative schematic diagram of an RPMC system using an iterative mechanism, in accordance with one or more example embodiments of the present disclosure.

FIG. 3B depicts an illustrative schematic diagram of an RPMC system using an iterative mechanism, in accordance with one or more example embodiments of the present disclosure.

Referring to FIG. 3B, there is shown successive iterations converging to a single final solution for the midpoint velocity of a position. Iterative solving of s-curve motions using numerical search algorithm. This approach to solving is especially beneficial when motion constraints change mid motion. Solving for new motion parameters algebraically while in-motion especially in stages 1, 3, 5, and 7 of an S-curve can be difficult and result in many unique transition cases. The iterative numerical approach is a simple algorithm that ensures a smooth transition when changing the desired end-point or velocity mid-motion at any point in the s-curve.

In one embodiment, the RPMC system may facilitate a robotic device to move in space during a training mode such that a robot is constantly being streamed points as the controller device being moved in space. In that sense, the robotic device is constantly trying to reach the location and the orientation of a point in space that the controller device is pointing to by moving in space. At the same time, as the controller device moves in space, the robotic device (e.g., the end effector of the robotic device or a gripper of the robot) attempts to catch up but will always be behind the movements of the controller device. In other words, the controller device may continuously send, at a predetermined interval, to the robotic device, points in space that the controller device is traversing through. Further, the movements of the robotic device may be constantly interrupted as a user's hand holding the controller device as the controller device moves in space is constantly changing from point-to-point. For example, when a user presses a trigger or a button on the controller device and moves his or her hand in a particular direction until letting go of the trigger at a destination. As a consequence, the robot moves to that destination. If the user is happy with the destination of the robot, the user may press a button on the controller device or on an external device (e.g. tablet), the user may lock that destination point in space, such that the robot is capable of going back to that destination point in space during the execution mode.

In another example, a user moves the controller device from point A to point B, the robot moves from point A towards point B, however, if the user moves the controller device to point C instead of point B, the robot must adjust and move towards point C. This is also true for small variations and interruptions in the motion of the controller device as the user moves the controller device in space. These types of small variations and interruptions may happen very seamlessly that are not visible but occur because of the unsteadiness of a user's hand as he or she moves the controller device in space. An iterative numerical approach, which may be a simple algorithm, ensures a smooth transition when changing the desired end-point or velocity mid-motion at any point in the robot trajectory.

In one embodiment, the RPMC system may compute the full motion profile, including the time to travel and the distance traveled, based on initial position, velocity, and acceleration values and the final desired velocity. This final velocity may be the midpoint velocity of the seven-segment motion profile if the method is being used to compute the first three stages, and is the final ending velocity of the seven-segment motion profile if the method is being used to compute the last three stages. The solution may be produced given the maximum velocity, acceleration, deceleration, and jerk of the motion profile. Acceleration may be used while solving the first three stages of the seven-segment motion profile, and deceleration is used for the last three stages.

The RPMC system may determine that no time is spent during the middle stage, where constant acceleration would occur. This may apply when the motion profile ramps the acceleration as high as possible within the given maximum jerk bounds, and then immediately ramps the acceleration back down to zero to finally arrive at the desired final velocity. As long as the acceleration value at the middle of the motion profile remains below the maximum allowable acceleration during this motion, then the profile is considered a valid profile.

In one embodiment, by evaluating the acceleration reached during the time spent in the first stage, the method determines whether this solution exceeded the maximum allowable acceleration. If the solution resulted in an acceleration magnitude greater than the maximum acceleration, a second solution may be calculated by assuming that the motion profile will consist of three sections, i.e., first ramping to the maximum acceleration, then holding at a constant acceleration for a given amount of time, and finally decelerating to the final required velocity.

In one embodiment, the RPMC system may require an iterative solution in some cases in order to arrive at a final answer due to the multi-part solution present. A closed form solution could conceivably be derived, but only after handling a multitude of corner cases and possibilities, resulting in a convoluted final solution. The present solution provides a simple, elegant way to solve dynamic motion profiles in a quick time period to apply these motions in real time to an industrial robotic arm. On a typical computer, without compiling the code, the solution runs at 20,000 solutions/second for the closed form solution, and 5,000 solutions/second for the iterative solution, allowing plenty of time to recalculate motions on the fly.

For example, the S-curve of the robotic device position over time may be calculated using the iterative numerical approach. For example, one or more iterative processes may be implemented until reaching solution. In FIG. 3B, there is shown acceleration, velocity, and position of a robotic device during the training mode and/or the execution mode. For example in the training mode, as explained above, interruptions may occur as the user is moving a controller device (e.g., a handheld device) in space. As the robotic device accelerate and increase speed, the iterative solving of the S-curve motions using numerical search algorithm may optimize the movement of the robotic device as its traversing from point to point while the control device is traversing through points in space. As shown in FIG. 3B, one or more iterations may be used to determine the final position of the robotic device. In this example, a first iteration, a third iteration, a fifth iteration, and a final iteration are shown. For example, a first iteration of the acceleration (e.g., iteration 309), a first iteration of the velocity (not shown in the figure), may result in a first iteration of the position (e.g., iteration 301) of the robotic device. The iterations may continue, for example a third iteration of the acceleration (e.g., iteration 310), a third iteration of the velocity (e.g., iteration 306), may result in a third iteration of the position (iteration 302). The iterations may continue, for example a fifth iteration of the acceleration (e.g., iteration 312), a fifth iteration of the velocity (e.g., iteration 307), may result in a fifth iteration of the position (iteration 303). Finally, a final iteration of the acceleration (e.g., iteration 314), a final iteration of the velocity (e.g., iteration 308), may result in a final iteration of the position (iteration 305).

With a usable solution to the constant jerk motion profile in one dimension complete, the linear solution may be applied to a three-dimensional robot. This may be accomplished by accepting new positions at any time during the motion of the robot and recalculating new motion profiles and trajectories. It is understood that the basic motion of the robot may consist of linear and angular motion.

Figure 4A:
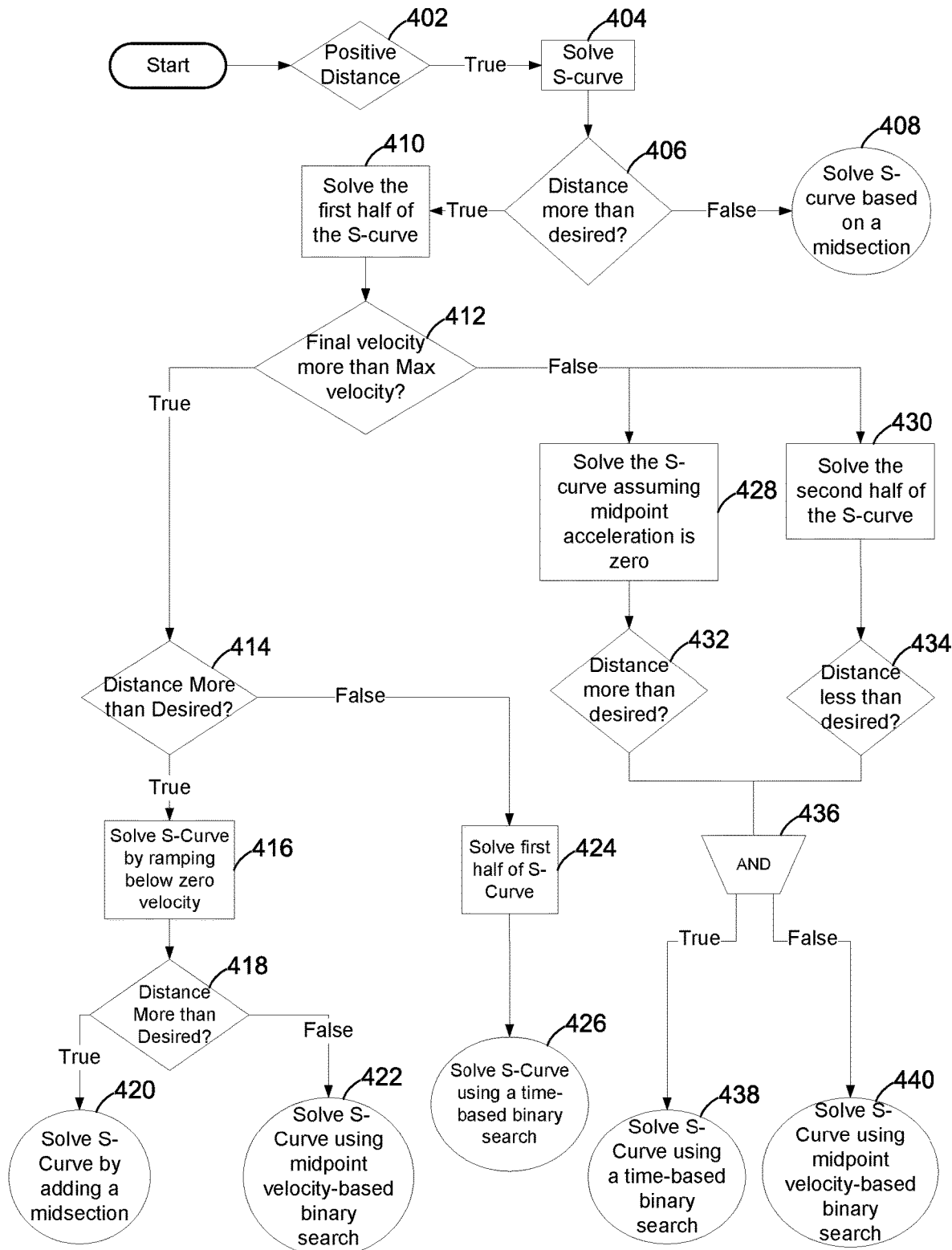
FIG. 4A depicts an illustrative flow diagram of an RPMC system, in accordance with one or more example embodiments of the present disclosure.

FIG. 4A depicts an illustrative schematic flow diagram of an RPMC system, in accordance with one or more example embodiments of the present disclosure. In one embodiment, the RPMC system may facilitate a robot to move in space during a training mode such that a robot is constantly being streamed points as the controller device being moved in space. In that sense, the robot is constantly trying to reach the location and the orientation of a point in space that the controller device is pointing to by moving in space. At the same time, as the controller device moves in space, the robot (e.g., the end effector of the robot or a gripper of the robot) attempts to catch up but will always be behind the movements of the controller device. In other words, the controller device may continuously send, at a predetermined interval, to the robot points in space that the control device is traversing through. Further, the movements of the robot may be constantly interrupted as a user's hand holding the controller device as the controller device moves in space is constantly changing from point-to-point. For example, when a user presses a trigger or a button on the controller device and moves his or her hand in a particular direction until letting go of the trigger at a destination. As a consequence, the robot moves to that destination. If the user is happy with the destination of the robot, the user may press a button on the controller device or on an external device (e.g. tablet), the user may lock that destination point in space, such that the robot is capable of going back to that destination point in space during the execution mode.

In another example, a user moves the controller device from point A to point B, the robot moves from point A towards point B, however, if the user moves the controller device to point C instead of point B, the robot must adjust and move towards point C. This is also true for small variations and interruptions in the motion of the controller device as the user moves the controller device in space. These types of small variations and interruptions may happen very seamlessly that are not visible but occur because of the unsteadiness of a user's hand as he or she moves the controller device in space. An iterative numerical approach, which may be a simple algorithm, ensures a smooth transition when changing the desired end-point or velocity mid-motion at any point in the robot trajectory.

Referring to FIG. 4A, the flow diagram 400 shows an algorithm for solving s-curve motion. Results in solving motion using three sub-algorithms: 1) standard 7 stage s-curve; 2) time-based binary search; or 3) midpoint velocity-based binary search.

At block 402, the RPMC system may start by first determining if the motion is in a positive distance (direction) or a negative distance. For simplicity, in the case of a negative distance (the false direction of block 402), the same flow diagram of FIG. 4A may apply with negated calculations.

In the case where the distance is a positive distance, at block 404 a determination is made to solve the S-curve, assuming the midpoint velocity equals a maximum velocity along the motion. It is understood that in a typical motion, at a first section of the motion profile, a ramp up to the maximum velocity is performed, then in a middle section, a maximum velocity is maintained, and finally at a last section of the motion profile, a ramp down to the minimum velocity is performed. It should be also understood that initial and final velocities may not necessarily be zero velocities. In other words, it is possible to start with an initial positive velocity, but end with a final negative velocity or vice versa. At a midpoint of the motion profile, it is expected to reach the maximum velocity.

In some scenarios, overshooting or undershooting the distance may occur. In the case of overshooting the distance, the velocity at the endpoint may not be at the minimum velocity. Undershooting the distance may occur if the minimum velocity is reached before reaching the endpoint.

At block 406, the RPMC system may determine whether the distance is more than the desired distance to reach an endpoint.

In the case where the distance is not more than the desired distance, at block 408, the RPMC system may solve the S-curve by adding a midsection that may travel the remaining distance at a constant velocity that may be set to the maximum velocity.

In the case where the distance is more than the desired distance, an overshoot condition may have occurred. In that case, at block 410, the RPMC system may solve the first half of the S-curve assuming the final acceleration is zero. That is, the RPMC system may assume that the midpoint acceleration is zero, meaning that a constant velocity is reached at the end of the first half. However, this may not necessarily mean that the maximum velocity is reached, but that a constant velocity is reached.

At block 412, the RPMC system may determine whether the final velocity at the end of the first half of the S-curve is more than the maximum velocity that was predetermined.

In the case where the final velocity is more than the maximum velocity, at block 414, the RPMC system may determine whether the distance is more than the desired distance. That is, the RPMC system may determine whether an overshoot condition may have occurred.

In the case where an overshoot condition may have occurred, at block 416, the RPMC system may determine that a negative velocity may be necessary in order to counter the overshoot condition in order to reach the desired distance. In that case, the assumption is that the midpoint velocity is the negative maximum velocity.

At block 418, the RPMC system may again determine whether the distance is more than desired due to an overshoot condition.

In the case an where an overshoot condition did occur, at block 420, the RPMC system may solve the S-curve by adding a midsection, which removes the extra distance by traveling at a negative maximum velocity. That is, the RPMC system may subtract the extra distance that caused the overshoot by adding a midsection traveling at a constant, but set to a negative maximum velocity.

In case where the overshoot condition did not occur, at block 422, the RPMC system may solve the S-curve by performing a midpoint velocity-based binary search in order to reach the desired distance. In other words, a velocity-based binary search between a positive maximum velocity and/or a negative maximum velocity is used to reach the desired distance.

Going back to block 414, if no overshoot condition occurred, at block 424, the RPMC system may solve the first half of the S-curve assuming the midpoint velocity is the maximum velocity. That is, the RPMC system is able to ramp up to the maximum velocity. The RPMC system may determine the time it takes to reach the maximum velocity if the RPMC system is able to reach the maximum velocity without overshooting. The time is then used to perform a time-based binary search.

At block 426, using the time determined at block 424, the RPMC system may solve the S-curve by performing a time-based binary search within the first half of the curve to reach the desired distance.

At block 428, based on the determination that the final velocity is not more than the maximum velocity, the RPMC system may solve the S-curve assuming the midpoint acceleration is zero (i.e., in the middle of the move, but the velocity is constant), and the midpoint velocity is less than or equal to the maximum velocity. Further, the RPMC system may determine the maximum time to complete the first half of that move; that is, the amount of time it takes to ramp up to some velocity and then maintain it.

At block 430, the RPMC system may solve the second half of the S-curve assuming the initial conditions equal those at the first half of the S-curve. This essentially determines whether the move can be completed using only deceleration such that deceleration alone does not cause an overshoot condition.

At block 432, the RPMC system may compare the distance resulting from solving the S-curve at block 428, to the desired distance to reach an endpoint.

At block 434, the RPMC system may compare the distance resulting from solving the second half of the S-curve at block 430, to the desired distance to reach the endpoint.

Both results from blocks 432 and 434 may be passed through a "logical AND" 436 in order to determine whether to apply a time-based binary search or a velocity-based binary search. Only when block 432 (the distance is more than the desired distance) and block 434 (the distance is less than the desired distance) are true, then the output of the logical AND 436 is true. However, if at least one of block 432 or block 434 is false, the output of the logical AND 436 is false.

In the case where the output is true, at block 438, the RPMC system may solve the S-curve by performing a time-based binary search within the first half of the curve to reach the desired distance.

In the case where the output is false, at block 440, the RPMC system may solve the S-curve by performing a midpoint velocity-based binary search between a positive maximum velocity and a negative maximum velocity to reach the desired distance.

It is understood that the above descriptions are for purposes of illustration and are not meant to be limiting.

Figure 4B:
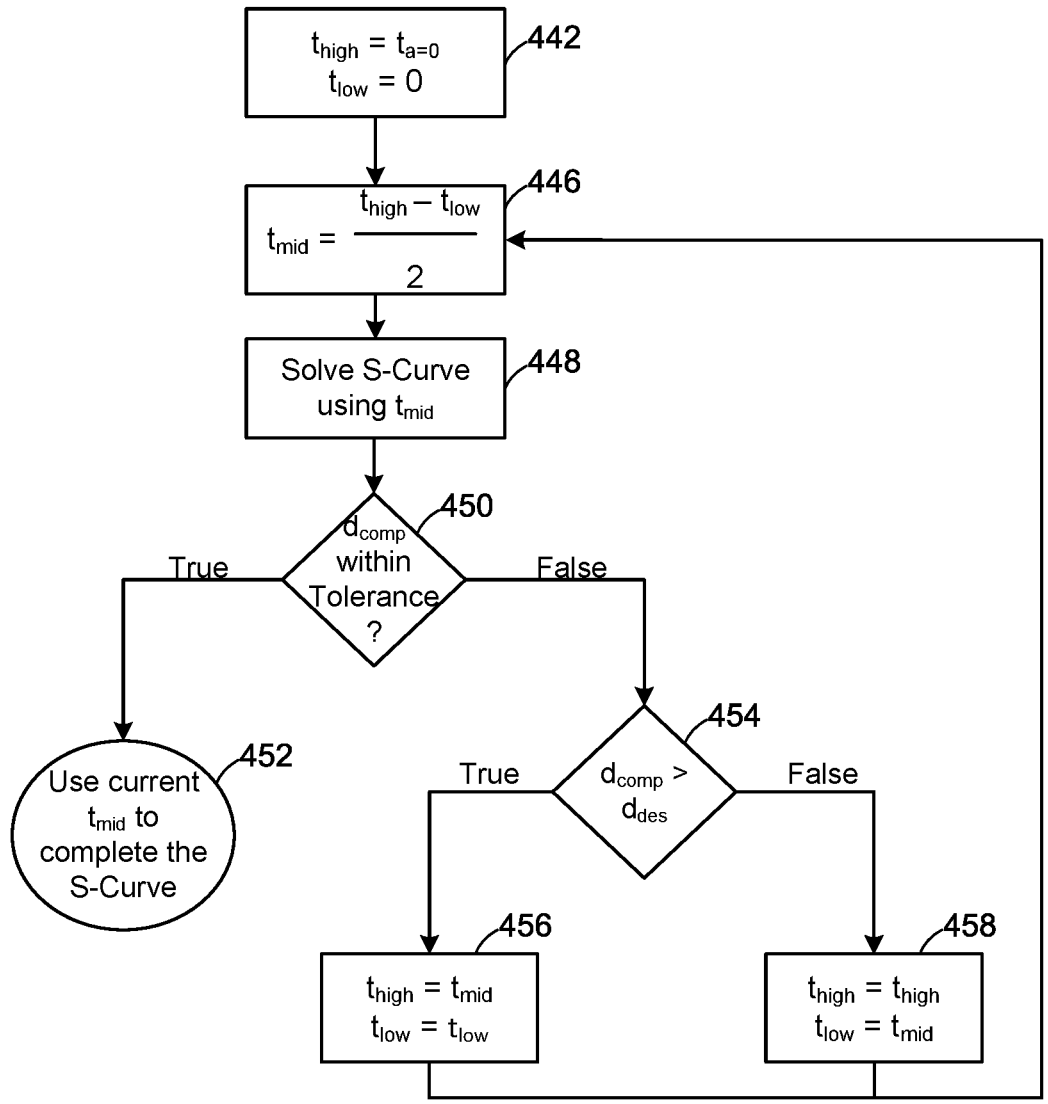
FIG. 4B depicts an illustrative flow diagram of a time-based binary search, in accordance with one or more example embodiments of the present disclosure.

FIG. 4B depicts an illustrative flow diagram of a time-based binary search, in accordance with one or more example embodiments of the present disclosure.

Referring to FIG. 4B, an RPMC system may implement a time-based binary search sub-algorithm or mechanism. The time-based binary search mechanism may determine that a motion moves from a current position up to a maximum velocity at some final time assuming that the maximum position may not be reached in that motion. The RPMC system may determine to reach a certain point in that motion and then from that point transition to a second half of the motion.

At block 442, an RPMC system may set a current high time ($t_{high}$) to be equal to a time to reach an acceleration of zero ($t_{a=0}$) and the current low time ($t_{low}$) to be equal to zero.

At block 446, the RPMC system may set the midpoint time ($t_{mid}$) to be equal to the difference between the current high time and the current low time divided by two.

At block 448, the RPMC system may solve the S-curve using the midpoint time calculated at block 446.

At block 450, the RPMC system may determine whether the computed distance ($d_{comp}$) is within tolerance.

At block 452, if the computed distance is within tolerance, the RPMC system may use the current midpoint time to complete the S-curve.

At block 454, if the computed distance was not within tolerance, the RPMC system may determine whether the computed distance is greater than the desired distance ($d_{des}$). In the case where the computed distance is greater than the desired distance, the RPMC may, at block 456, set the current high time to be equal to the midpoint time and the current low time to be equal to the current low time. In the case where the computed distance is not greater than the desired distance, the RPMC system may, at block 458, set the current high time to be equal to the current high time and the current low time to be equal to the midpoint time. The process would then continue by setting the midpoint time to be equal to the difference between the current high time and the current low time divided by two.

It is understood that the above descriptions are for purposes of illustration and are not meant to be limiting.

Figure 4C:
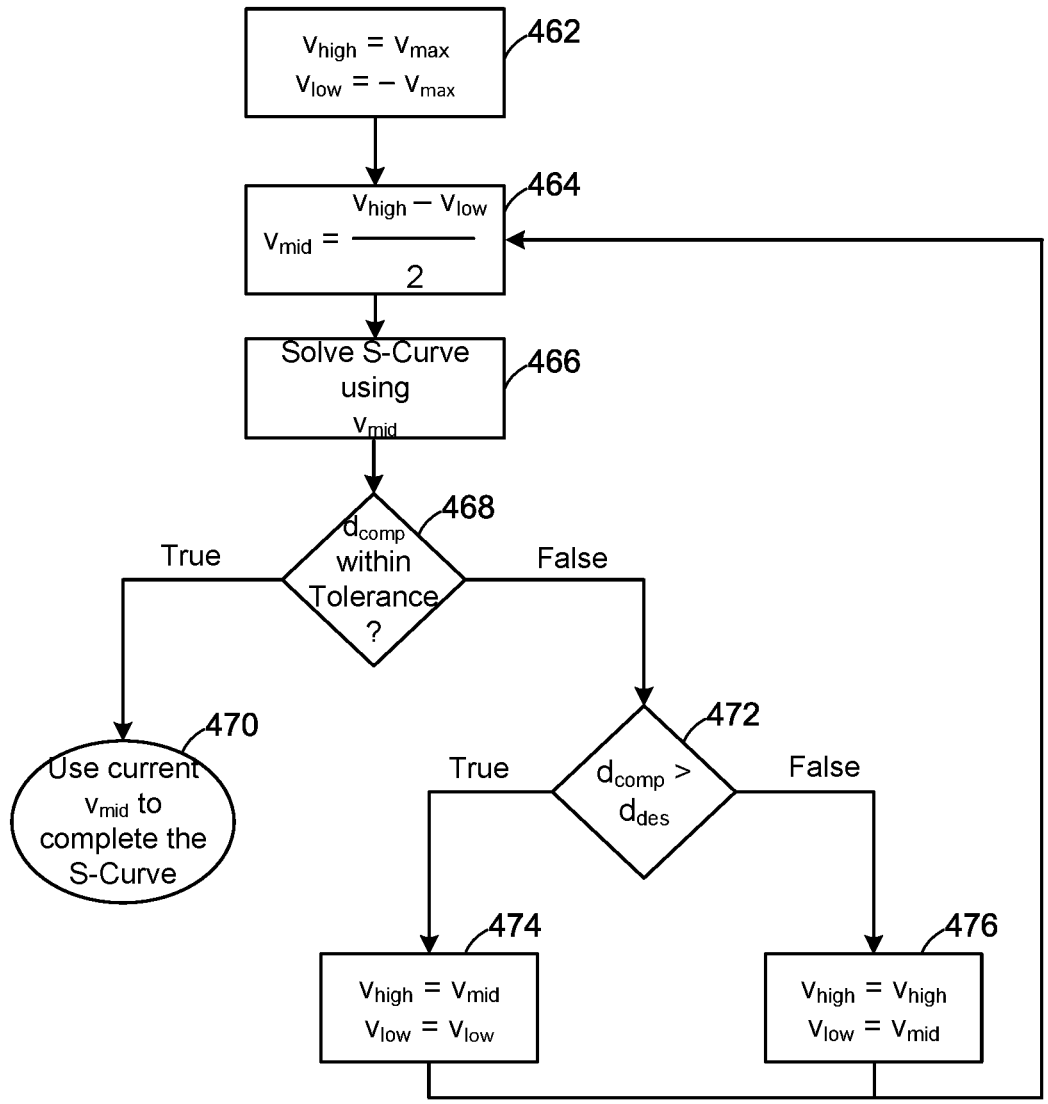
FIG. 4C depicts an illustrative flow diagram of a velocity-based binary search, in accordance with one or more example embodiments of the present disclosure.

FIG. 4C depicts an illustrative flow diagram of a velocity-based binary search, in accordance with one or more example embodiments of the present disclosure.

Referring to FIG. 4C, an RPMC system may implement a midpoint velocity-based binary search sub-algorithm or mechanism. The S-curve may be solved by performing the midpoint velocity-based binary search between a positive maximum velocity and a negative maximum velocity to reach the desired distance.

At block 462, the RPMC system may set the current high velocity ($v_{high}$) to be equal to the positive maximum velocity ($v_{max}$) and the current low velocity ($v_{low}$) to be equal to the negative maximum velocity ($-v_{max}$).

At block 464, the RPMC system may set the midpoint velocity ($v_{mid}$) to be equal to the difference between the current high velocity and the current low velocity divided by two.

At block 466, the RPMC system may solve the S-curve using the midpoint velocity.

At block 468, the RPMC system may determine whether the computed distance ($d_{comp}$) is within tolerance.

At block 470, if the computed distance is within tolerance, the RPMC system may use the midpoint velocity to complete the S-curve.

At block 472, if the computed distance was not within tolerance, the RPMC system may determine whether the computed distance is greater than the desired distance ($d_{des}$). In the case where the computed distance is greater than the desired distance, the RPMC system may, at block 474, set the current high velocity to be equal to the midpoint velocity and the current low velocity to be equal to the current low velocity. In the case where the computed distance is not greater than the desired distance, the RPMC system may, at block 476, set the current high velocity to be equal to the current high velocity and the current low velocity to be equal to the midpoint velocity. The process may continue by setting the midpoint velocity to be equal to the difference between the current high velocity and the current low velocity divided by two.

It is understood that the above descriptions are for purposes of illustration and are not meant to be limiting.

Figure 5A:
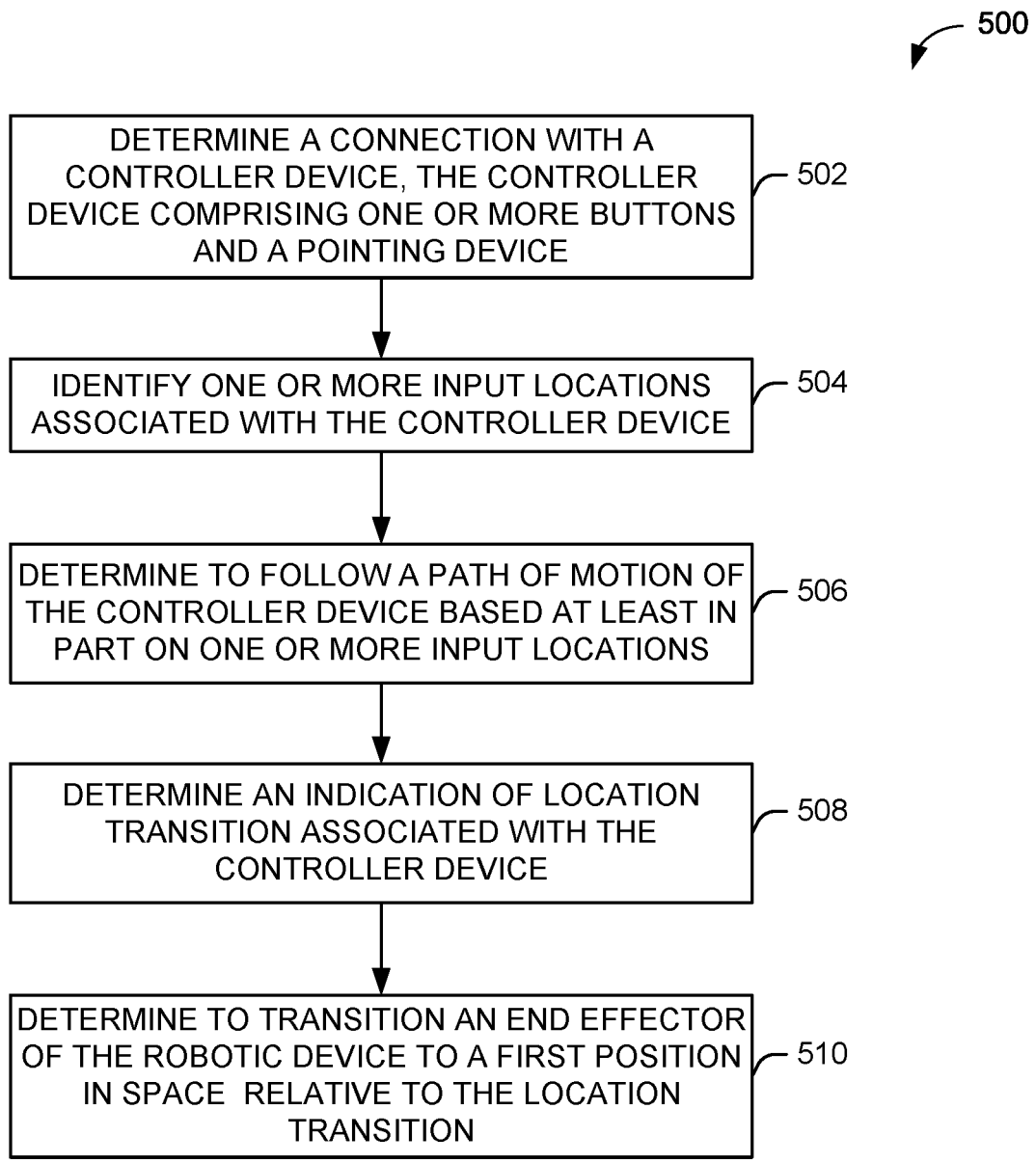
FIG. 5A depicts a flow diagram of an illustrative process for an RPMC system, in accordance with one or more example embodiments of the present disclosure.

FIG. 5A depicts a flow diagram of an illustrative process 500 for an RPMC system, in accordance with one or more example embodiments of the present disclosure.

At block 502, a robotic device (e.g., the robotic device(s) 120 of FIG. 1) may determine a connection with a controller device, the controller device comprising one or more buttons and a pointing device. The robotic device may be an industrial robotic arm. The controller device may be an instrument capable of sending information to the application programming interface (API) for the robotic device. Some example of these instruments may include handheld devices, wireless devices, such as, devices that are capable of position and orientation. The controller device may comprise a joystick in addition to other input buttons and/or trigger buttons. For example, a user may stand in any orientation, activate a pressure sensitive "trigger" on a hand-held controller, move their hand, and have the robot move in the same direction as their hand. In other words, a user may hold the controller device and may move his or her hand such that the robot moves in the same direction as the hand gesture. That is, the robot may follow the controller device's movement direction regardless of the controller device's orientation and with a speed that is proportional to the amount of force applied to the trigger. For example, squeezing the trigger only a small amount allows for slow precise control. The joystick on top of the controller is used for fine positioning rotation or translation. The end effector always moves in whatever direction the user presses the joystick regardless of controller orientation.

At various points in the path of movement, the user is capable of recording points along the path for later execution by the robot. This allows the user to program the robot very quickly and intuitively. That is, to teach points, a user may move the robot to the desired position and press a "save" button on the controller device (or other connected devices, such as a tablet). Positions can be recorded as point-to-point moves or as portions of the spline. Although the controller device may be operated on its own, a tablet allows for functions like viewing and editing the programming, adjusting points and saving programs, the user can define speed acceleration change move types and activate rippers. The user may also add program logs for machine vision or welding. The Sisu robot controller takes robot programming to a new level by dramatically decreasing the time and complexity of programming thousands of new applications now open automation.

At block 504, the robotic device may identify one or more input locations associated with the controller device. The robotic device may operate in a training mode or an execution mode, wherein the training mode is based on receiving the one or more input locations associated with the controller device. During the training mode such that a robot is constantly being streamed points as the controller device being moved in space. In that sense, the robot is constantly trying to reach the location and the orientation of a point in space that the controller device is pointing to by moving in space. At the same time, as the controller device moves in space, the robot (e.g., the end effector of the robot or a gripper attached to the end effector) attempts to catch up but will always be behind the movements of the controller device, in time. In other words, the controller device may continuously send, at a predetermined time interval, to the robot points in space that the controller device is traversing through.

At block 506, the robotic device may determine to follow a path of motion of the controller device based at least in part on one or more input locations.

In a training mode, the controller device is capable of learning and capturing points in space at various locations being traversed during the training mode. The captured points may be stored on a memory device as points and/or as programs for later retrieval during an execution mode. The user may press the pressure sensitive trigger to gain control of the robot. The robot may be moved into the desired position and orientation of a point in space and then the trigger is released. A button is pressed on the controller device to "add" the point. Adding the point means that the point is recorded into the program for later execution in the execution mode. The robot may then be moved to subsequent positions and orientations where additional points are added. Buttons can be configured on the controller to manipulate various functions of the robot or end effector. An example of an end effector may be a gripper on the robot such that the gripper is capable of gripping objects to be manipulated by the robot. A new point can be added to a given position that opens or closes the gripper at that position. It is possible to alter or modify the recorded points and/or may be new points in space may be recorded. For example, a user is capable of scrolling to various recorded points and then pressing a button to modify or insert a point. The user is also capable of adjusting the robot to the desired position and "add" the point.

The vector of joystick motion may be mapped to a plane intersecting the controller device 102, and corresponding global position vectors are applied to the robotic device 120. The vector of joystick motion may be left, right, up, down, forward, and backward. The control device 102 and the robotic device 120 may communicate through a system control device determine the position and orientation of both the control device 102 and the robotic device 120 at a specific time. The system control device may facilitate communication between the control device 102 and the robotic device 120 in order to effectuate movement of the robotic device 120 such that a tool or an end effector of the robotic device 120 is capable of moving from one point to another point in space. One or more reference planes may be defined allowing a user holding the controller device and using a pointing device (e.g., a joystick) on the controller device and/or one or more buttons on the controller device to move the end effector of a robot to move in a desired direction. The one or more reference planes may include at least a global reference frame and a tool reference frame. The global reference frame may be a reference frame that is common to one or more devices, such as, the robot end effector and the controller device. The tool reference frame may be a reference frame that follows a tool attached to the end effector. Therefore, if the controller device is locked to the global reference frame, the controller device and the end effector of the robot follow the global reference frame. If the control device is locked to the tool reference frame, the controller device and the end effector of the robot follow the tool reference frame.

At block 508, the robotic device may determine an indication of location transition associated with the controller device. For example, the robotic device may detect a change of location of the controller device and/or its pointing device (e.g., a joystick).

At block 510, the robotic device may determine to transition an end effector of the robotic device to a first position in space relative to the location transition. The movements of the robot may be constantly interrupted as a user's hand holding the controller device as the controller device moves in space is constantly changing from point-to-point. For example, when a user presses a trigger or a button on the controller device and moves his or her hand in a particular direction until letting go of the trigger at a destination. As a consequence, the robot moves to that destination. If the user is happy with the destination of the robot, the user may press a button on the controller device or on an external device (e.g. tablet), the user may lock that destination point in space, such that the robot is capable of going back to that destination point in space during the execution mode. In another example, a user moves the controller device from point A to point B, the robot moves from point A towards point B, however, if the user moves the controller device to point C instead of point B, the robot must adjust and move towards point C. This is also true for small variations and interruptions in the motion of the controller device as the user moves the controller device in space. These types of small variations and interruptions may happen very seamlessly that are not visible but occur because of the unsteadiness of a user's hand as he or she moves the controller device in space. An iterative numerical approach, which may be a simple algorithm, ensures a smooth transition when changing the desired end-point or velocity mid-motion at any point in the robot trajectory. It is understood that the above descriptions are for purposes of illustration and are not meant to be limiting.

Figure 5B:
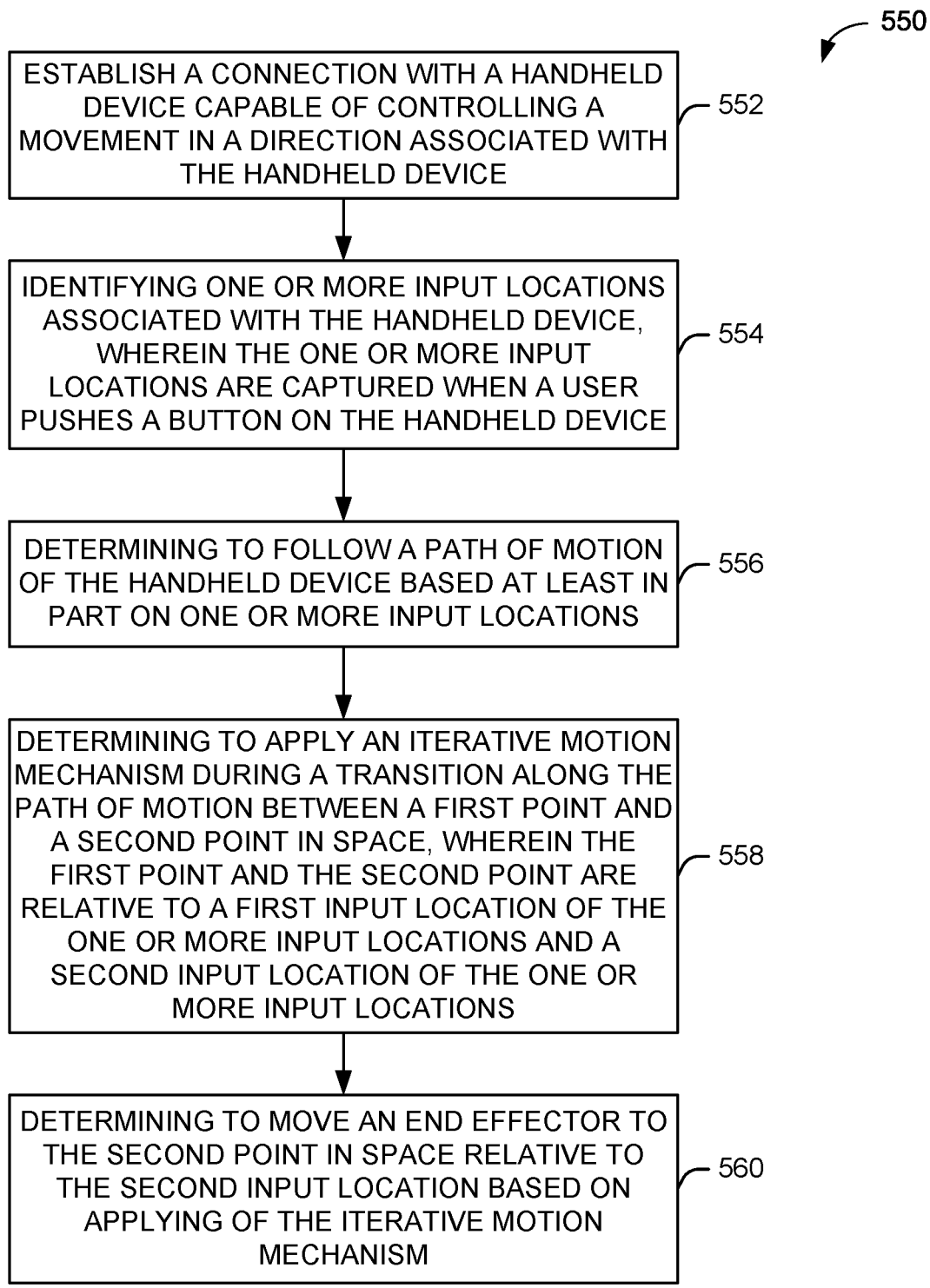
FIG. 5B depicts a flow diagram of an illustrative process for an RPMC system, in accordance with one or more example embodiments of the present disclosure.

FIG. 5B depicts a flow diagram of an illustrative process 550 for an RPMC system, in accordance with one or more example embodiments of the present disclosure.

At block 552, a robotic device (e.g., the robotic device(s) 120 of FIG. 1) may establish a connection with a handheld device capable of controlling a movement in a direction associated with the handheld device. An RPMC system may include the robotic device the controller device, and/or a system control device. These devices may communicate in accordance with, and be compliant with, various communication standards and protocols, such as Wi-Fi, UDP, TSN, wireless (or wired) USB, Wi-Fi P2P, Bluetooth, NFC, or any other communication standard. The robotic device and the controller device may communicate through various networks or through a system control device. The controller device may control the robotic device by transmitting control signals to the robotic device through a wire or through wireless signals and vice versa. For example, the controller device may send the control signal as an Ethernet packet through an Ethernet connection to the robotic device. Further, the controller device may send and receive messages with the robotic device using the system control device. The robotic device may operate in a training mode or an execution mode, wherein the training mode is based on receiving the one or more input locations associated with the controller device.

At block 554, the robotic device may identifying one or more input locations associated with the handheld device, wherein the one or more input locations are captured when a user pushes a button on the handheld device. During the training mode such that a robot is constantly being streamed points as the controller device being moved in space. In that sense, the robot is constantly trying to reach the location and the orientation of a point in space that the controller device is pointing to by moving in space. At the same time, as the controller device moves in space, the robot (e.g., the end effector of the robot or a gripper attached to the end effector) attempts to catch up but will always be behind the movements of the controller device, in time. In other words, the controller device may continuously send, at a predetermined time interval, to the robot points in space that the controller device is traversing through. The controller device may include one or more buttons that may be used to capture one or more points in space associated with a location of the robotic device in a learning mode. Further, the controller device may include navigation buttons that may delete one or more points in space in an execution path.

At block 556, the robotic device may determining to follow a path of motion of the handheld device based at least in part on one or more input locations. For example, the user may press a first button on the controller device in order to capture a point in space. The user may then move his or her hand to another location in space and then press the same button to capture another point in space and so on. This will create a path of movement that the robot can repeat in an execution mode. The user may initiate the execution mode using a button on the controller device. In that case, the robot may follow that path such that its end effector(s) traverses the points that were captured using the controller device at each button press during the teaching mode.

At block 558, the robotic device may determining to apply an iterative motion mechanism during a transition along the path of motion between a first point and a second point in space, wherein the first point and the second point are relative to a first input location of the one or more input locations and a second input location of the one or more input locations. The movements of the robot may be constantly interrupted as a user's hand holding the controller device as the controller device moves in space is constantly changing from point-to-point. For example, when a user presses a trigger or a button on the controller device and moves his or her hand in a particular direction until letting go of the trigger at a destination. As a consequence, the robot moves to that destination. If the user is happy with the destination of the robot, the user may press a button on the controller device or on an external device (e.g. tablet), the user may lock that destination point in space, such that the robot is capable of going back to that destination point in space during the execution mode. An iterative numerical approach, which may be a simple algorithm, ensures a smooth transition when changing the desired end-point or velocity mid-motion at any point in the robot trajectory. Although the controller device may be operated on its own, a tablet allows for functions like viewing and editing the programming, adjusting points and saving programs, the user can define speed acceleration change move types and activate rippers. The user may also add program logs for machine vision or welding. The Sisu robot controller takes robot programming to a new level by dramatically decreasing the time and complexity of programming thousands of new applications now open automation.

At block 560, the robotic device may determining to move an end effector to the second point in space relative to the second input location based on applying of the iterative motion mechanism. For example, as a user moves the controller device from point A to point B, the robot moves from point A towards point B, however, if the user moves the controller device to point C instead of point B, the robot must adjust and move towards point C. This is also true for small variations and interruptions in the motion of the controller device as the user moves the controller device in space. These types of small variations and interruptions may happen very seamlessly that are not visible but occur because of the unsteadiness of a user's hand as he or she moves the controller device in space.

It is understood that the above descriptions are for purposes of illustration and are not meant to be limiting.

FIG. 6 illustrates a block diagram of an example of a robotic machine 600 or system upon which any one or more of the techniques (e.g., methodologies) discussed herein may be performed. In other embodiments, the robotic machine 600 may operate as a stand-alone device or may be connected (e.g., networked) to other machines. In a networked deployment, the robotic machine 600 may operate in the capacity of a server machine, a client machine, or both in server-client network environments. In an example, the robotic machine 600 may act as a peer machine in peer-to-peer (P2P) (or other distributed) network environments. The robotic machine 600 may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

Certain embodiments may be implemented in one or a combination of hardware, firmware, and software. Other embodiments may also be implemented as program code or instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the robotic machine 600 may include one or more processors and may be configured with program code instructions stored on a computer-readable storage device memory. Program code and/or executable instructions embodied on a computer-readable medium may be transmitted using any appropriate medium including, but not limited to, wireless, wireline, optical fiber cable, RF, etc., or any suitable combination of the foregoing. Program code and/or executable instructions for carrying out operations for aspects of the disclosure may be written in any combination of one or more programming languages, including an object-oriented programming language such as Java, Smalltalk, C++ or the like, and conventional procedural programming languages, such as the "C" programming language or similar programming languages. The program code and/or executable instructions may execute entirely on a device, partly on the device, as a stand-alone software package, partly on the device and partly on a remote device or entirely on the remote device or server.

The robotic machine 600 may include at least one hardware processor 602 (e.g., a central processing unit (CPU), a graphics processing unit (GPU), a hardware processor core, or any combination thereof), a main memory 604, and a static memory 606. The robotic machine 600 may include drive circuitry 618. The robotic machine 600 may further include an inertial measurement device 632, a graphics display device 610, an alphanumeric input device 612 (e.g., a keyboard), and a user interface (UI) navigation device 614 (e.g., a mouse). In an example, the graphics display device 610, the alphanumeric input device 612, and the UI navigation device 614 may be a touch screen display. The robotic machine 600 may additionally include a storage device 616, a robotic programming and motion control device 619, a network interface device/transceiver 620 coupled to antenna(s) 630, and one or more sensors 628. The robotic machine 600 may include an output controller 634, such as a serial (e.g., universal serial bus (USB), parallel, or other wired or wireless (e.g., infrared (IR), near field communication (NFC), etc.) connection to communicate with or control one or more peripheral devices. These components may couple and may communicate with each other through an interlink (e.g., bus) 608. Further, the robotic machine 600 may include a power supply device that is capable of supplying power to the various components of the robotic machine 600.

The drive circuitry 618 may include a motor driver circuitry that operates various motors associated with the axes of the robotic machine 600. Motors may facilitate the movement and positioning of the robotic machine 600 around the respective axes for a plurality of degrees of freedom (e.g., X, Y, Z, pitch, yaw, and roll). The motor driver circuitry may track and modify the positions around the axes by affecting the respective motors.

The inertial measurement device 632 may provide orientation information associated with a plurality of degrees of freedom (e.g., X, Y, Z, pitch, yaw, roll, roll rate, pitch rate, yaw rate) to the hardware processor 602. The hardware processor 602 may in turn analyze the orientation information and generate, possibly using both the orientation information and the encoder information regarding the motor shaft positions, control signals for each motor. These control signals may, in turn, be communicated to motor amplifiers to independently control motors to impart a force on the system to move the system. The control signals may control motors to move a motor to counteract, initiate, or maintain rotation.

The hardware processor 602 may be capable of communicating with and independently sending control signals to a plurality of motors associated with the axes of the robotic machine 600.

The storage device 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the robotic machine 600. In an example, one or any combination of the hardware processor 602, the main memory 604, the static memory 606, or the storage device 616 may constitute machine-readable media.

The antenna(s) 630 may include one or more directional or omnidirectional antennas, including, for example, dipole antennas, monopole antennas, patch antennas, loop antennas, microstrip antennas, or other types of antennas suitable for the transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

The robotic programming and motion control device 619 may carry out or perform any of the operations and processes (e.g., the processes 500 and 550) described and shown above. For example, the robotic programming and motion control device 619 may be configured to facilitate activation of a pressure sensitive "trigger" on the controller device that may vary the control mechanism of a robot based on the amount of pressure.

The robotic programming and motion control device 619 may facilitate controlling the robot's motion based on a hand gesture while holding the controller device. For example, a user may hold the controller device and may move his or her hand such that the robot moves in the same direction as the hand gesture. That is, the robot may follow the controller device's movement direction regardless of the controller device's orientation and with a speed proportional to the amount of force applied to the trigger. Therefore, larger distance would be covered by the movement of the end effector of the robot relative to the movement of the controller device in space.

For example, squeezing the trigger only a small amount allows for slow precise control. The joystick on top of the controller is used for fine positioning rotation or translation. The end effector always moves in whatever direction the user presses the joystick regardless of controller orientation.

At various points in the path of movement, the user is capable of recording points along the path for later execution by the robot. This allows the user to program the robot very quickly and intuitively. That is, to teach points, a user may move the robot to the desired position and press a "save" button on the controller device (or other connected devices, such as a tablet). Positions can be recorded as point-to-point moves or as portions of the spline.

The robotic programming and motion control device 619 may allow the user to translate and articulate the end effector in all six axes of motion simultaneously. The robotic programming and motion control device 619 may also allow the user to seamlessly switch from macro movements to fine jog-type movements, which are controlled by the joystick on the controller. The direction of jog is defined by the orientation of the controller and updates dynamically as the user changes the controller's orientation. The robotic programming and motion control device 619 may also allow the user to release the trigger, reposition his or her hand, grab the trigger, and move the robot anew. The robotic programming and motion control device 619 may allow the user to lock the end effector at a point in space and articulate around that point or lock out all other axes and rotate the end effector around a single axis. Control of the robot is independent of how the user is facing. The user just pushes or pulls the robot where it needs to go and if the user goes to the other side of the machine the user does not have to think backwards when controlling the robot.

The robotic programming and motion control device 619 may determine a motion profile having one or more stages of motion. The one or more stages of motion may be associated with the application of velocity, acceleration, and jerk. The RPMC system may capture one or more positions and states of a robotic device to facilitate a full sequence of motions.

The robotic programming and motion control device 619 may determine a motion profile having unknown initial and final conditions by combining a numerical method as well as an iterative method.

The robotic programming and motion control device 619 may apply an iterative method in order to determine a midpoint velocity. The iterative process may replace an upper or lower bound value with a current midpoint based on a resulting undershoot or overshoot condition of a final position.

The robotic programming and motion control device 619 may perform successive iterations in order to converge to a single solution for the midpoint velocity.

The robotic programming and motion control device 619 may determine that no time is spent during a middle stage of a motion profile. During the middle stage of the motion profile, constant acceleration may occur. This implies that the motion profile may ramp the acceleration as high as possible within the given maximum jerk bounds, and then immediately ramp the acceleration back down to zero to finally arrive at the desired final velocity. As long as the acceleration value at the middle of the motion profile remains below the maximum allowable acceleration during this motion, then the profile is considered a valid profile and is used as the solution.

The robotic programming and motion control device 619 may solve an S-curve of a motion profile using either a time-based binary search or a midpoint velocity-based binary search based on whether an overshoot or an undershoot condition occurs.

The robotic programming and motion control device 619 may determine in a time-based binary search that a motion moves from a current position up to a maximum velocity at some final time assuming that the maximum position may not be reached in that motion. The RPMC system determines to reach a certain point in that motion and then from that point transition to a second half of the motion. For the first half of the move, a time-based binary search solves for a time that allows completing the second half of the move to ultimately reach the final desired position. Accordingly, a certain acceleration is needed in order to reach the desired final distance.

It is understood that the above are only a subset of what the robotic programming and motion control device 619 may be configured to perform and that other functions included throughout this disclosure may also be performed by the robotic programming and motion control device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random-access memory (RAM), magnetic disk storage media; optical storage media' a flash memory, etc.

The term "machine-readable medium" may include any medium that is capable of storing, encoding, or carrying instructions for execution by the robotic machine 600 and that cause the robotic machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, and peer-to-peer (P2P) networks, among others. In an example, the network interface device/transceiver 620 may include one or more physical jacks (e.g., Ethernet, coaxial, or phone jacks) or one or more antennas (e.g., antennas 630) to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the robotic machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a single input single output (SISO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations. Certain aspects of the disclosure may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system."

The computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A robotic device, comprising:
   at least one memory that stores computer-executable instructions; and
   at least one processor configured to access the at least one memory, wherein the at least one processor is configured to execute the computer-executable instructions to:
      determine a connection with a controller device, the controller device comprising one or more buttons and a pointing device;
      identify one or more input locations associated with the controller device;
      determine to follow a path of motion of the controller device based at least in part on the one or more input locations;
      determine an indication of location transition associated with the controller device; and
      determine to transition an end effector of the robotic device to a first position in space relative to the location transition, wherein the transition is based at least in part on a pressure sensitive trigger button of the controller device, and wherein the transition of the end effector traverses a larger distance when the trigger button is fully pressed than when the trigger button is partially pressed.

2. The robotic device of claim 1, wherein the location transition is a movement of the pointing device on the controller device or a movement of the controller device in space.

3. The robotic device of claim 1, wherein the controller device is a handheld device operated by a user.

4. The robotic device of claim 1, wherein the robotic device is an industrial robotic arm.

5. The robotic device of claim 1, wherein the robotic device is capable to operate in a training mode or an execution mode, wherein the training mode is based on receiving the one or more input locations associated with the controller device.

6. The robotic device of claim 1, wherein the at least one processor is further configured to execute the computer-executable instructions to:
   determine message indicating entering an execution mode of a stored program associated with a training mode; and
   cause to traverse one or more recorded points in space based on the stored program.

7. The robotic device of claim 5, wherein the training mode includes the controller device capturing the one or more input locations of the controller device by clicking a first button on the controller device at each of the one or more input locations.

8. The robotic device of claim 1, wherein the at least one processor is further configured to execute the computer-executable instructions to:
   determine an orientation of the controller device;
   determine indication of a push of the pointing device in a first direction; and
   cause to transition the end effector of the robotic device based on the orientation and the first direction.

9. The robotic device of claim 8, wherein to determine the orientation of the controller device comprises the at least one processor further configured to execute the computer-executable instructions to determine the orientation of the controller device relative to global axes or a local axes.

10. The robotic device of claim 1, wherein to identify one or more input locations comprises the at least one processor further configured to execute the computer-executable instructions to identify the one or more input locations received at a predetermined time interval.

11. The robotic device of claim 1, wherein the at least one processor is further configured to execute the computer-executable instructions to:
   lock the end effector of the robotic device at a point in space; and
   articulate the robotic device around that point in space.

12. A non-transitory computer-readable medium storing computer-executable instructions which when executed by one or more processors of a controller device result in performing operations comprising:
   establish a connection with a handheld device capable of controlling a movement in a direction associated with the handheld device;
   identifying one or more input locations associated with the handheld device, wherein the one or more input locations are captured when a user pushes a button on the handheld device;
   determining to follow a path of motion of the handheld device based at least in part on one or more input locations;
   determining to apply an iterative motion mechanism during a transition along the path of motion between a first point and a second point in space, wherein the first point and the second point are relative to a first input location of the one or more input locations and a second input location of the one or more input locations; and
   determining to transition an end effector to the second point in space relative to the second input location based on applying of the iterative motion mechanism, wherein the transition is based at least in part on a pressure sensitive trigger button of the controller device, and wherein the transition of the end effector traverses a larger distance when the trigger button is fully pressed than when the trigger button is partially pressed.

13. The non-transitory computer-readable medium of claim 12, wherein the operations further comprise:
   determining an orientation of the controller device;
   determining indication of a push of a pointing device in a first direction, wherein the pointing device is associated with the controller device; and
   causing to transition the end effector based on the orientation and the first direction.

14. The non-transitory computer-readable medium of claim 12, wherein the operations further comprise:
   locking the end effector of the robotic device at a point in space; and
   articulating the robotic device around that point in space.

15. The non-transitory computer-readable medium of claim 12, wherein the iterative motion mechanism is associated with one or more stages of motion, and wherein the one or more stages of motion are associated with an application of velocity, acceleration, or jerk.

16. The non-transitory computer-readable medium of claim 13, wherein the operations further comprise determining the orientation of the controller device relative to global axes or a local axes.

17. A method comprising:
   determining, by one or more processors on a robotic device, a connection with a controller device, the controller device comprising one or more buttons and a pointing device;
   identifying one or more input locations associated with the controller device;
   determining to follow a path of motion of the controller device based at least in part on the one or more input locations;
   determining an indication of location transition associated with the controller device; and
   determining to transition an end effector of the robotic device to a first position in space relative to the location transition, wherein the transition is based at least in part on a pressure sensitive trigger button of the controller device, and wherein the transition of the end effector traverses a larger distance when the trigger button is fully pressed than when the trigger button is partially pressed.

18. The method of claim 17, wherein the location transition is a movement of the pointing device on the controller device or a movement of the controller device in space.

* * * * *